United States Patent [19]
Elischewski

[11] Patent Number: 5,789,887
[45] Date of Patent: Aug. 4, 1998

[54] AUTOMATIC DOOR

[75] Inventor: Klaus Elischewski, Dortmund, Germany

[73] Assignee: Dorma GmbH + Co. KG, Ennepetal, Germany

[21] Appl. No.: 664,401

[22] Filed: Jun. 17, 1996

Related U.S. Application Data

[63] Continuation-in-part of PCT/DE94/01122, Sep. 22, 1994.

[30] Foreign Application Priority Data

Dec. 17, 1993 [DE] Germany .................. 43 43 191.7

[51] Int. Cl.⁶ .................................................. G05B 5/00
[52] U.S. Cl. ........................ 318/468; 318/286; 318/452; 364/167.01; 49/29
[58] Field of Search ........................ 318/280, 282, 318/286, 466, 467, 468, 469, 470, 603, 283, 602, 640, 266, 617, 452; 364/167.01, 178, 400; 49/25, 28, 139, 280, 348, 349, 29; 160/1, 405; 187/316, 336

[56] References Cited

U.S. PATENT DOCUMENTS

| | | | |
|---|---|---|---|
| 4,342,379 | 8/1982 | Games et al. | 187/316 |
| 4,401,929 | 8/1983 | Odaka et al. | 318/466 |
| 4,563,625 | 1/1986 | Kornbrekke et al. | 318/603 |
| 4,809,817 | 3/1989 | Kawai | |
| 4,831,509 | 5/1989 | Jones et al. | 364/167.01 |

FOREIGN PATENT DOCUMENTS

| | | |
|---|---|---|
| 0167211 | 1/1986 | European Pat. Off. |
| 3515945 | 11/1986 | Germany |
| 3932263 | 3/1990 | Germany |
| 4204399 | 10/1992 | Germany |
| 4207705 | 4/1993 | Germany |
| 4206272 | 9/1993 | Germany |
| 9307326 | 9/1993 | Germany |
| 58-012011 | 1/1983 | Japan |
| 2072415 | 3/1990 | Japan |
| 9316949 | 9/1993 | WIPO |

*Primary Examiner*—John W. Cabeca
*Attorney, Agent, or Firm*—Nils H. Ljungman and Associates

[57] ABSTRACT

A memory system for an automatic door, the memory system being capable of recording for a specified length of time all relevant operational parameters according to the first-in/first-out principle.

9 Claims, 29 Drawing Sheets

AUTOMATIC DOOR

CONTINUING APPLICATION DATA

This application is a Continuation-In-Part application of International Application No. PCT/DE94/01122, filed on Sept. 22, 1994, which claims priority from Federal Republic of Germany Patent Application No. 43 43 191.7, filed on Dec. 17, 1993. International Application No. PCT/DE94/01122 was pending as of the filing date of the above-cited application, and the U.S. was an elected state in International Application No. PCT/DE94/01122.

BACKGROUND OF THE INVENTION

1. Field of the Invention

The present invention generally relates to an automatic door, the door panels of which are propelled by a drive system, whereby the drive system has a closed-loop or open-loop control system which contains a microprocessor. The operation of the door can thereby be influenced by all sorts of different sensors. The microprocessor is responsible for the control and regulation of the operation of the corresponding door panel, on the basis of its sequential program, which is a function of the type of door connected, e.g., a sliding door, curved panel door, folding door, rotating panel door, revolving door, etc., whereby one of the objectives of operation is to guarantee the maximum level of safety for the people using the door.

2. Background Information

A similar door is described, for example, in German Laid Open Patent Application No. 42 07 705 in the form of a revolving door. This revolving door is regulated or controlled by means of a data processing (or computerized) unit, whereby the individual functions of the control system and of the microprocessor used are monitored internally. There is no recording of the individual parameters which relate to the door which is connected to the system.

German Patent No. 35 15 945 discloses a door or window drive system in which the individual parameters can be set and adjusted by means of an externally connected data input device.

A method and a device for starting the operation of a sliding door using an open-loop or closed-loop control system are disclosed in German Laid Open Patent Application No. 42 06 272. In this operating starting method, the sliding doors execute a learning cycle. The data obtained from the initial learning cycle are then stored in a permanent memory. The entire process thereby relates only to the startup of such a door system.

German Utility Model G 93 07 326 describes a door control unit which is equipped with a microprocessor control system for sliding doors. The sensors required for such a door are also connected to the microprocessor control system.

OBJECT OF THE INVENTION

One object of the present invention is to permanently record and retain the sequence of operations of an automatic door with all its parameters, as well as the signals from the connected sensors.

SUMMARY OF THE INVENTION

The invention teaches that this object can be accomplished by installing a system on the door which is capable of recording and/or storing all the dynamic and static parameters of the door and of the drive system and of the open-loop and closed-loop control systems, as well as the signals from the sensors, for a defined length of time. In other words, there is a device which measures and records the overall behavior of the door for a current (or recent) period of time. The current period of time is thereby defined as the period of time which was measured most recently before the occurrence of a malfunction and thus immediately before the potential failure of the door. The length of this period can be variable, and should be as long as required by the sequence of operations of the door. The length of this period is also a function of the size of the memory and of the specific application, because a permanent recording is made on the basis of the first-in/first-out principle. In practical terms, this means in particular that all the system-relevant parameters, such as the power supply, the data from the position sensors, displacement sensors and/or data on the rotational movement, all the information from the sensors and detectors, as well as the data from the open-loop and closed-loop control systems and the motor data, such as the current consumption or the speed of rotation and direction of rotation, are digitized and stored in a non-volatile, dynamic (e.g., refreshable, rewriteable, etc.) memory of the system. Because the information is recorded using the first-in/first-out principle, it is possible to always call up the latest information. This information is relevant in particular if there is an abnormal operation or malfunction, and can be used, for example, to determine whether the abnormality or malfunction in question relates to defective components, or is the result of tampering or improper operation of the door.

Such a system is also capable of identifying malfunctions which occur only sporadically on existing door systems, and thereby makes it possible to perform service more rapidly, efficiently and economically.

On the basis of the microprocessor which is part of the open-loop or closed-loop control system, it is possible to feed the digitized parameters into a memory which records and/or stores these parameters for an individually specified time interval. The invention teaches that the length of this interval can be set as a function of the type of operation of the connected door type.

Since the overall behavior of a door is measured and stored for a current period of time, this overall behavior also includes the correct operation of the connected system of sensors and/or the external programming and control stations. The invention therefore provides a procedure which gives the service technician an unprecedented ability to immediately determine, on the basis of the recorded data, which elements of the door led to the failure or malfunction. Consequently, it is possible, in particular with volatile door abnormalities, i.e., contact errors, to define the abnormalities in question. This stored data is not only used as a reference or as a basis for a comparison of the actual and specified behavior of the drive system itself, and thus for the open-loop or closed-loop control of such a door. Rather, in practical terms, the fault memory is a sort of higher-level monitoring device for the entire system, which can also include, for example, the correct execution of a learning cycle. In contrast to the prior art, in which LEDs are sometimes used to indicate malfunctions or abnormalities, the fault memory provided by the invention makes possible a direct indication of the abnormality of all relevant data and parameters, both static and dynamic, in clear text.

Furthermore, by means of an interface, the content of this fault memory can also be transmitted by means of a modem to a service center. As a result of this capability, the operator of such a door system can see the malfunction message immediately when the malfunction occurs, and can indicate which parts of the door are malfunctioning and why. In particular, if there are several doors, this measure represents a major advance if the data are transmitted to a control center, where the malfunctions can be identified and the required technicians can be dispatched.

The system can be designed so that it can be retrofitted on existing doors, the software for which can then be adapted as necessary.

In addition to the above-mentioned recording or storage of the parameters and the signals from the sensors, the system is capable of responding to a remote command to transmit the contents of the memory to a central control point in the building, for example, or to a service department. As a result of this measure, service can be performed much more rapidly and efficiently, since a potential malfunction in the door can be localized with great precision as a result of the recorded parameters.

It can therefore be assumed that the fault memory can be used as part of a higher-level intelligence of an automatic door system.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying figures, wherein.

DESCRIPTION OF THE PREFERRED EMBODIMENTS

Figure 1:
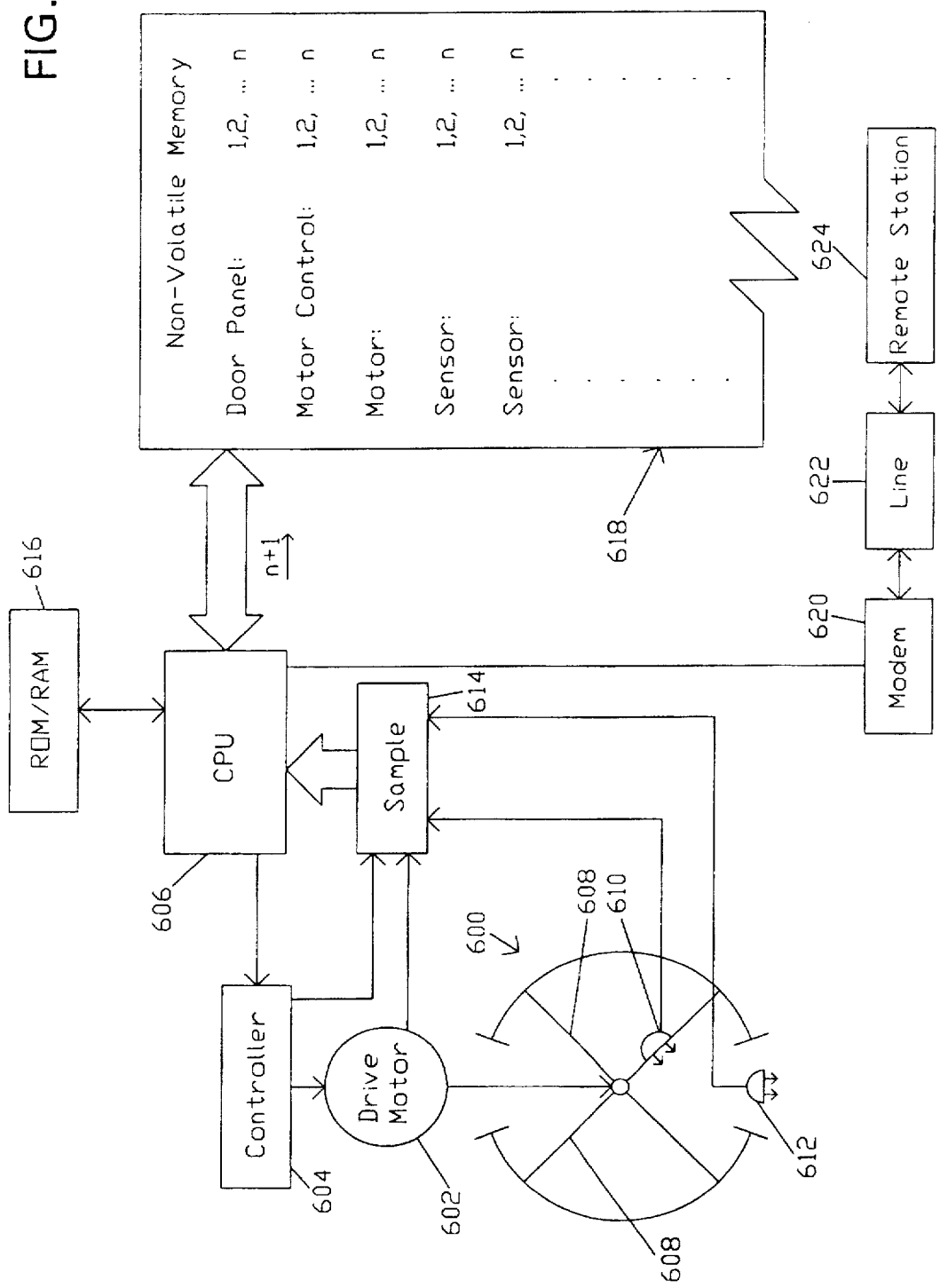
FIG. 1 is a schematic illustration of a monitoring system according to the invention installed to monitor the operation of a revolving door.

In FIG. 1 there is schematically illustrated one embodiment of the present invention which is employed to monitor the operation of a revolving door 600, the revolving door 600 being driven by a drive motor 602. The drive motor 602 is controlled by a drive motor controller unit 604, which may employ, for example, either an open-loop or closed-loop method of controlling the speed of revolution, etc. of the revolving door 600. The controller unit 604 is in turn controlled by a microprocessor CPU (or central processing unit) 606. The revolving door 600 generally includes a number of revolving door panels 608 and preferably at least a first sensor unit 610. For example, the sensor unit 610 can be configured to detect a force exerted on one of the door panels 608 by a user of the revolving door 600. A second sensor unit 612, for example, for sensing the position, displacement or rotational movement (e.g., speed and/or direction of rotation) of the door panels 608 may also be provided.

The CPU 606 is preferably provided with all the information concerning the operation of the revolving door 600. Thus, there may be preferably provided a sampling circuit 614 of a type well known in the art, e.g., a so-called "sample and hold circuit", which samples the output of the sensors 610 and 612 and provides the CPU 606 with digitized signals representative of the output values of the sensors 610 and 612. Additionally, the CPU 606 is also preferably provided with all additional available signals from the system which are indicative of the operation of the revolving door 600, that is, signals from the drive motor 602 and the drive motor controller unit 604, which may be employed in either an open-loop or closed-loop control method of controlling the operation of the motor 602. Thus, all of the relevant information concerning the operation of the revolving door 600, e.g., the power supply parameters, information from positional sensors (e.g., sensor 612), displacement sensors and/or rotational movement sensors, information indicative of the operation of the open-loop and/or closed-loop control system, and information regarding the operation of the motor 602 (e.g., the current consumption, speed of rotation, and direction of rotation of the motor 602) is provided to the CPU 606, e.g., through the sample circuit 614 in digital form.

The CPU 606 retrieves program instructions for controlling the operation of the revolving door 600, as well as the instructions for the monitoring program described herein, from a ROM and/or RAM memory circuit 616 and stores temporary program data therein. The operational parameters of the revolving door 600 described above, that is, the data from the sensors 610 and 612 and the data regarding the speed, direction of rotation, etc. are preferably stored by the CPU 606 in a non-volatile dynamic memory element 618 which may be, for example, a so-called "flash" memory element. As shown schematically in FIG. 1, a determined number of the most recent values of the operational parameters of the revolving door 600 discussed above, for example, the n most recent values of each of the operational values, are stored in the non-volatile dynamic memory element 618 by the CPU 606. As indicated in FIG. 1, these operational parameters may include, for example, operational parameters relating to the operation of the door panel 608, the motor controller unit 604, the drive motor 602, the first sensor 610 and the second sensor 612, along with any other relevant operational parameters that it may be desirable to track. As each new operational parameter value is generated, the oldest corresponding operational parameter is discarded. Thus, when the n+1st operational parameter value relating to the drive motor 602 is generated and stored by the CPU 606, the oldest corresponding operational parameter relating to the drive motor 602 is discarded, so that only the n most recent values are stored in the non-volatile dynamic memory element 618. The number of stored samples n can of course be adjusted through appropriate adjustment of the program of the CPU 606 and is limited only by the capacity of the non-volatile dynamic memory element 618.

FIG. 1 additionally illustrates one feature of this particular embodiment of the invention, wherein the CPU 606 is provided with a telecommunications device, e.g., a modem 620, which allows the CPU to communicate, via the modem 620 and a telecommunications channel 622 (e.g., a telephone line) with a remote data station 624, for example, another computer installed at a monitoring station. This arrangement allows for the remote monitoring of proper operation of the revolving door 600 and the shutting down of operation and/or the dispatch of repair personnel upon a malfunction.

Figure 2:
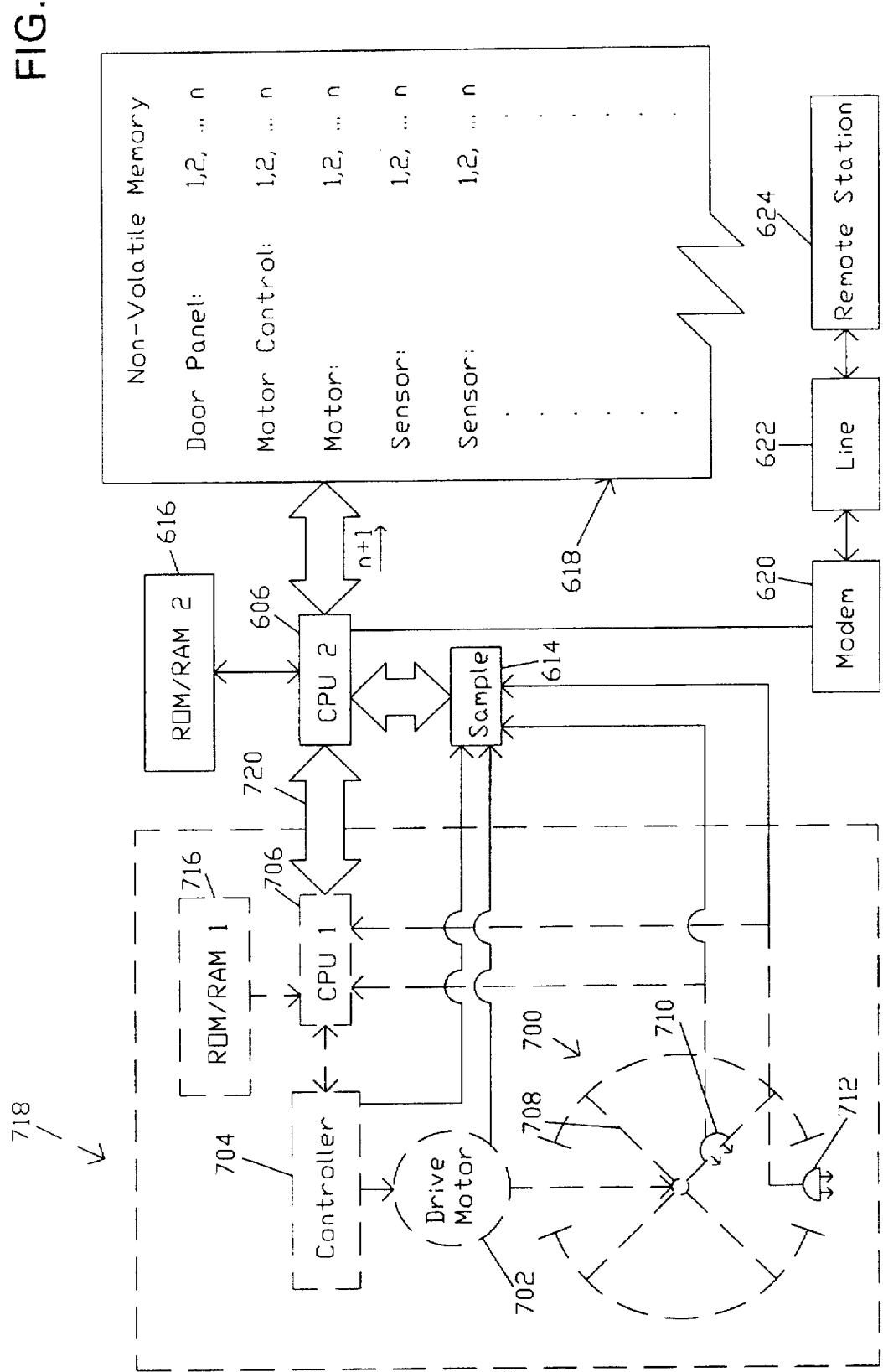
FIG. 2 is a schematic illustration of a monitoring system according to the invention, retrofitted to monitor the operation of an already previously installed revolving door.

FIG. 2 is a schematic illustration of another embodiment of the invention, wherein the monitoring system according to the invention is "retrofitted" to monitor the operational parameters of an already previously installed revolving door 700, which includes, for example, door panels 708, a drive motor 702, a drive motor controller unit 704, sensors 710 and 712, a first CPU, CPU1 706 for monitoring and controlling the operation of the drive motor 702 and/or the drive motor controller unit 704, and a ROM/RAM memory element, ROM/RAM1 716 for supporting the operation of the CPU1 706. In FIG. 2, the already previously installed revolving door system is shown in broken lines and is generally represented by the reference numeral 718.

Additionally, in FIG. 2, the newly added components which are retrofitted to the already previously installed revolving door system 718 are shown in solid lines and are generally represented by the same reference numerals as above. Thus, the additional components employed to retrofit the monitoring system of the invention to the previously installed revolving door system 718 generally include a CPU, i.e., CPU2 606, supporting ROM/RAM memory element ROM/RAM2 616, sample circuit 614, non-volatile memory element 618, modem 620, communications channel 622 and remote data station 624. These additional components function in substantially the same manner as those components having the same reference numerals which are described above with respect to FIG. 1. Some of the operational parameters which are stored in the non-volatile memory element 618 may be routed to CPU2 606 either via a data path (e.g., bus) 720 between CPU1 706 and CPU2 606, or through the sample circuit 614, as shown by the lines leading thereinto in FIG. 2.

The following discussion with respect to FIGS. 3–30 relates to automatic door systems which employ microprocessors in their control systems and which, therefore, the monitoring system of the present invention may be employed in conjunction therewith.

FIGS. 3–15 illustrate a microprocessor controlled revolving door having a start up sequence which ensures that the door is operating properly.

On the basis of a sequential program which is stored in the memory which is part of the microprocessor, the system guarantees that the motor current may not exceed a maximum specified value for more than a specified time base. The magnitude of the motor current is a measurement which is representative of the force which can occur between the primary and secondary closing edges of an automatic door. For example, a sequential program can be designed so that, in the startup phase, current is applied to the drive motor by means of a control command. The connected power supply which is responsible for supplying power to the drive motor is generally sized with some reserve capacity (that is, oversized), so that the door panel, which is quite heavy, can be placed in motion quickly. Thus the motor can be accelerated as indicated by the maximum curve of its torque characteristic without exceeding the allowable force. But at the same time, the motor current is measured continuously, and on the basis of the sequential program, the motor current is preferably reduced at the point where it exceeds the torque curve. Because the setpoint is reduced, the measured value of the motor current is also simultaneously reduced, and thus there is a reduction in the forces which occur. If the motor current were to increase above the maximum allowable value while the door was in operation, the drive would be shut down by means of a second disconnect system. This feature guarantees that the door panels pose no danger to the persons using the door.

Frequently, one and the same open-loop control unit, and thus also the closed-loop control unit, is used for different types of doors, which means that the motor which is connected will be different, as a function of the weights of the door panels in question or the requirements of the specific site. For this reason, the motor characteristics are preferably stored in a non-volatile memory, which can be an $E^2$-PROM (or "EEPROM", e.g., electrically erasable programmable read only memory), for example. But it is also possible that the door system can use its intelligent capabilities to measure the motor characteristics by means of a learning cycle, and the values determined during this learning cycle are also stored in a non-volatile memory, where they can be called up and processed by the microprocessor which is part of the system. In addition to the measurement of the motor characteristics and thus of the motor current, the motor voltage is also preferably measured.

Figure 3:
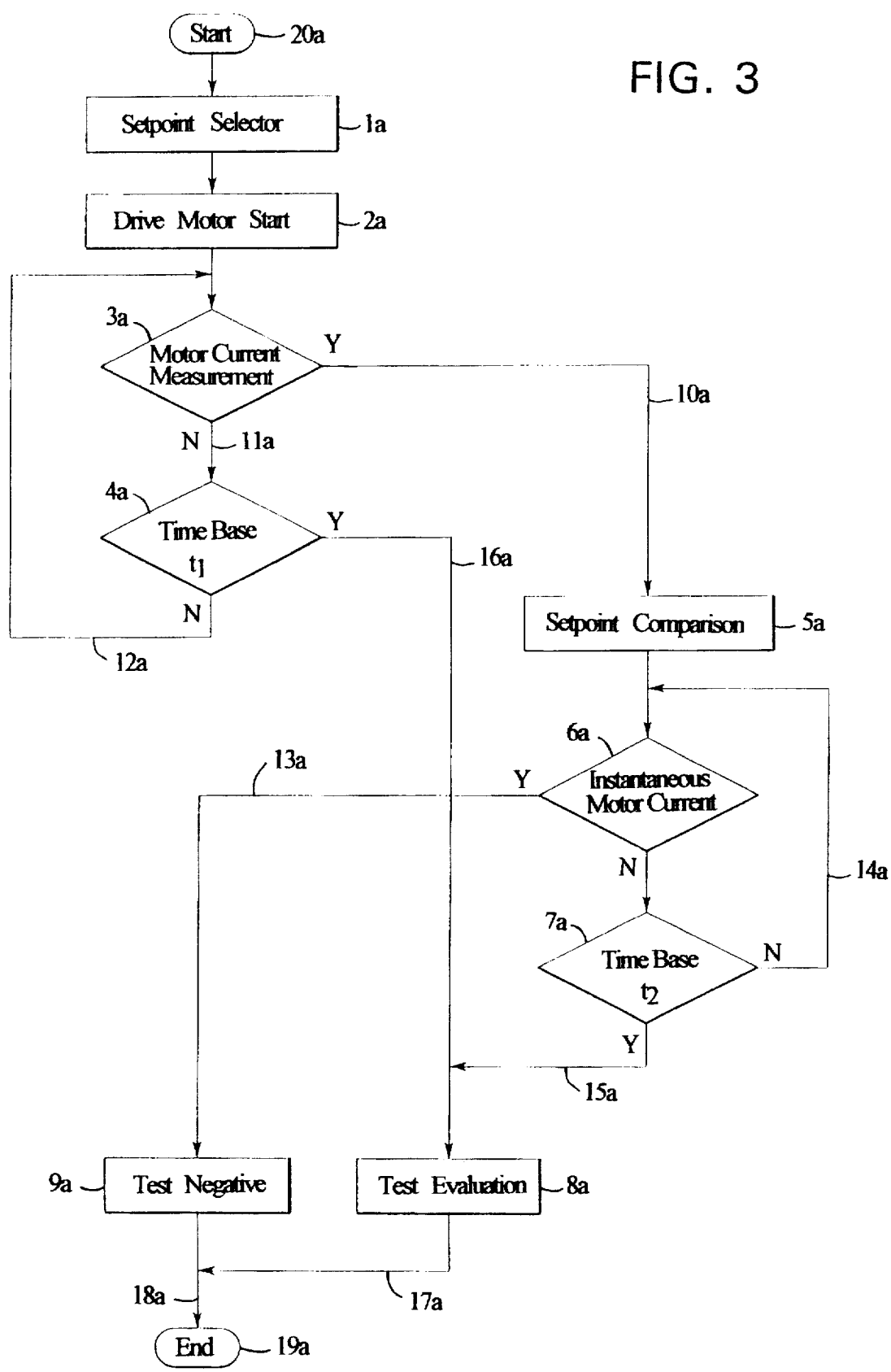
FIG. 3 is a flow chart of a test procedure during the starting phase.

A method is employed which makes it possible, on account of a specified, selectable time interval, to guarantee that the drive is tested to verify that the maximum forces on the primary and secondary closing surfaces are within parameters before each operating cycle. FIG. 3 is a flow diagram in which a starting command 20a is given which activates the setpoint selection 1a. The setpoint selection 1a specifies the maximum allowable motor current, which lies above the allowable current for normal operation. This maximum allowable motor current is in turn stored in a non-volatile memory, after it has been measured in a learning cycle or after it has been programmed. Then the drive motor is started by the start command 2a. By performing a measurement of the motor current 3a, the magnitude of the motor current, which increases during the starting phase, can be determined. If the actual value of the motor current is below the maximum allowable value, this value is transmitted by the means of the selection 10a to a subroutine which performs a setpoint comparison 5a. The setpoint of the motor current is reprocessed in an actual value comparison element 6a. If the actual value is greater than the allowable value, by means of the message "lower actual value" 13a, this fact is forwarded to the "test negative" evaluation element 9a. Because the test has produced a negative result, a command 18a goes to the end of the test program 19a. If a time has been specified, this test can then be repeated either immediately or at a later time, depending on the customer's requirements. But if the current of the motor is at a value which is less than the maximum allowable value, this current is transmitted by the sequential program to the time base 7a $t_2$. If the total amount of time required for the sequence is within the specified time $t_2$, this fact is reported to the test evaluation element 8a by means of the test report element 15a. The test evaluation element 8a indicates that the test has been conducted with a positive result, and thus the drive is operating within the requirements. This fact is then reported via the command element 17a to the end of the test 19a. It is not necessary to repeat the test at a later time for this direction of operation. But if the motor current is on a level which is higher than allowed, this fact is reported by means of the time base 7a and the feedback loop 14a to the actual value element 6a of the motor current. But if the motor current is reduced within the period $t_2$ of the time base 7a, then as described above, a positive test result is reported. If the drive is not capable of keeping the motor current within the specified limits in the specified length of time $t_2$, then this fact is reported to the program by means of the actual value element 6a and the reporting element 13a as a negative test result 9a.

There is another branch of the program, in which the detection of the motor current 3a at a level which is below the allowable value is reported by means of the selection element 11a to the time base 4a $t_1$. If the time has not yet elapsed, this fact is reported by means of the test reporting element 16a to the test evaluation element 8a as a positive result of the test. But if the test is negative within the time base 4a, this fact is reported via the feedback loop 12a to the motor current measurement element 3a, so that a decision can be made by the program between a positive or a negative test within the specified time.

Figure 4:
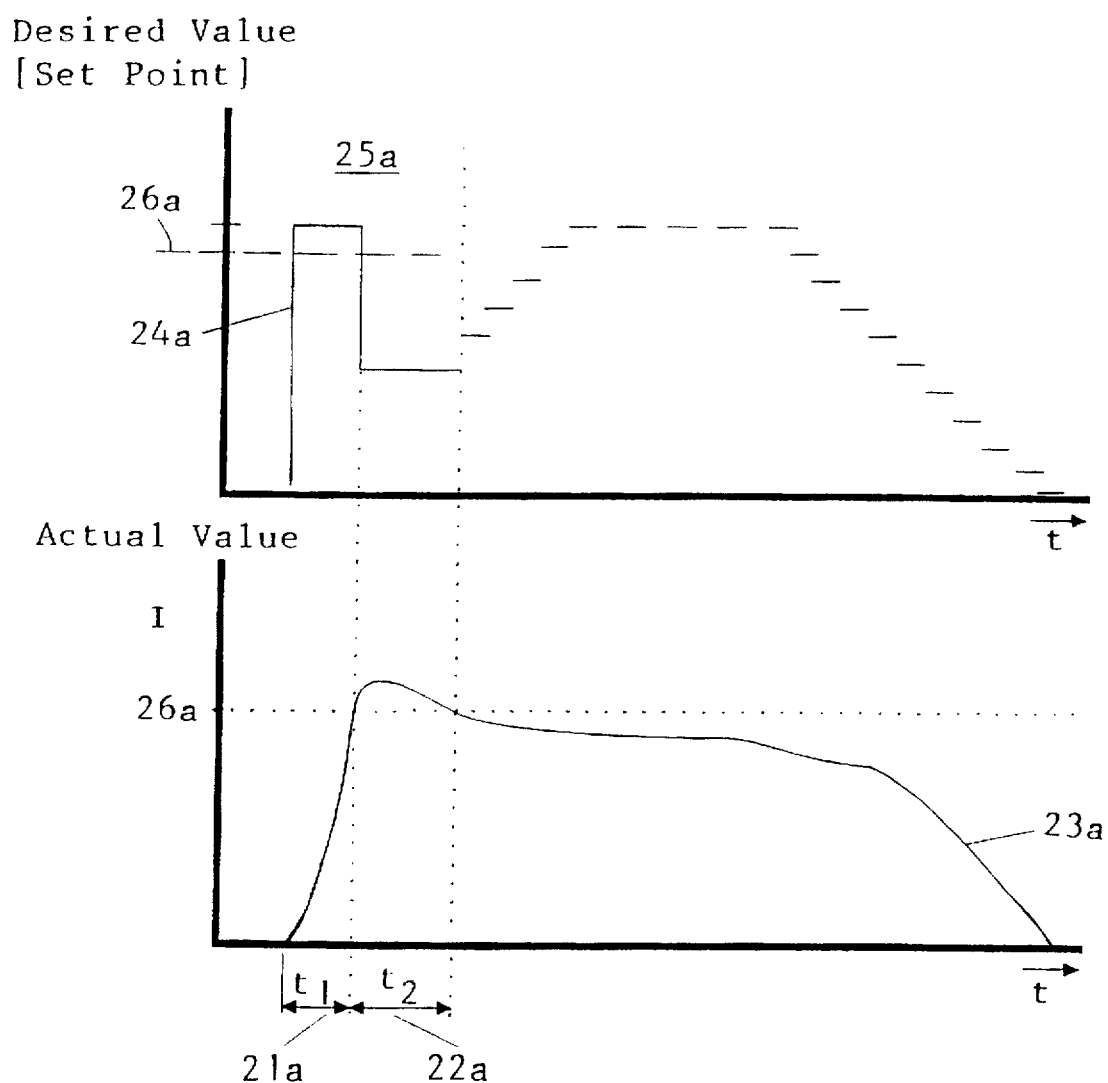
FIG. 4 shows a setpoint selection with the curve of a motor current.

FIG. 4, in the lower curve, shows the curve of the actual value of the motor current 23a over time, and in the upper curve shows the setpoint selection 24a of the motor current. The motor current is controlled on the basis of a pulse width modulation. In the test phase 25a, as illustrated in the flow chart in FIG. 3, the drive is tested at its maximum possible power, i.e. at the maximum attainable force between the primary and secondary closing surfaces. In the curve of the measured motor current 23a it is clear that the entire test must take place in the periods $t_1$ 21a and $t_2$ 22a. This curve also shows that the maximum motor current for the period 22a lies above the maximum allowable motor current 26a. The distance travelled by the door panels during this period is negligible.

As a result of the program sequences described above, it is clear that there is provided a method which makes it possible to simply and economically regulate the motor current and keep it within specified ranges, and at the same time offers a maximum degree of safety.

In other words, referring back now to FIG. 4, at the beginning of a first time period $t_1$, the desired value (or "setpoint") $I_{Desired}$ of the motor current is set by the program run by the microprocessor of the control apparatus to a first value that is greater than the maximum allowed motor current during normal operation of the automatic door, referred to hereinafter as $I_{Max}$ (shown as 26a in FIG. 4). During this first time period $t_1$, the program then performs a check to determine that the actual current of the drive motor $I_{Actual}$ (shown as 23a in FIG. 4) does in fact reach a value within the first time period $t_1$ that exceeds the maximum allowed motor current during normal operation $I_{Max}$. If $I_{Actual}$ fails to exceed $I_{Max}$ by the expiration of the first time period $t_1$ during which $I_{Desired}$ has been set to a value that is significantly greater than $I_{Max}$ then a test negative result is reached by the program, and the operation of the automatic door is at least temporarily disabled. That is, the door is not permitted to operate until, for example, a repair person has performed an inspection.

At the expiration of the first time period $t_1$, assuming that the value of $I_{Actual}$ has in fact exceeded $I_{Max}$ then a second operational test is conducted in which $I_{Desired}$ is set by the microprocessor at the beginning of a second time period $t_2$ to a value which is significantly less than $I_{Max}$. During the second time period $t_2$, the program determines whether the actual value of the motor current $I_{Actual}$ has in fact fallen down to or below the maximum allowed motor current during normal operation $I_{Max}$. If, during the second time period $t_2$, $I_{Actual}$ has fallen to or below $I_{Max}$, then a positive test result is reported and the automatic door is permitted to continue in an operational state. If, however, at the expiration of the second time period $t_2$, $I_{Actual}$ remains substantially above $I_{Max}$, then once again a negative test result is reported and the automatic door is at least temporarily disabled as explained above.

Figure 5:
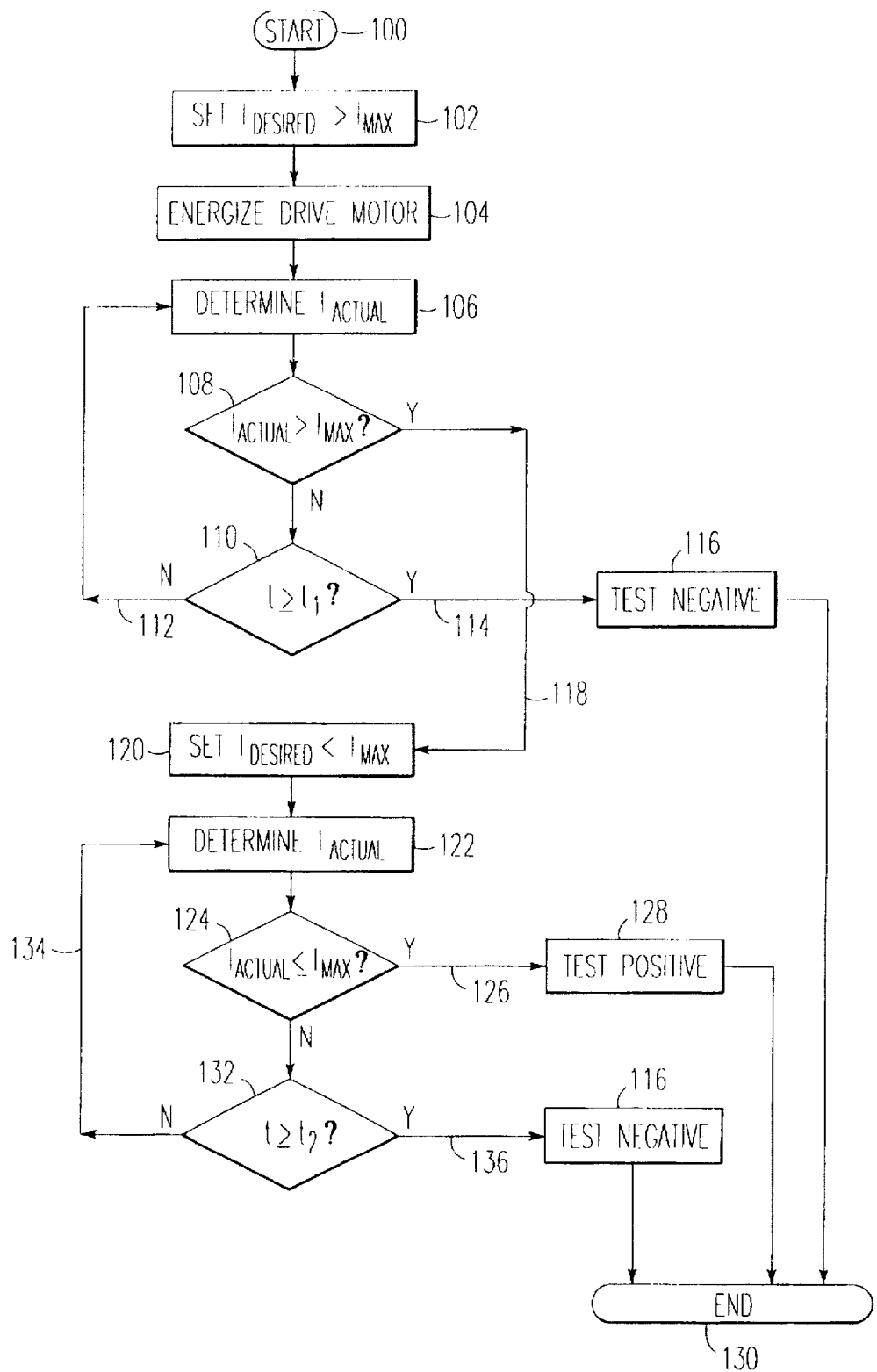
FIG. 5 is a flow chart of an alternative embodiment of a program to implement the test procedure.

FIG. 5 is a flow chart illustrating another embodiment of a program which may be run by a microprocessor to carry out the procedure described immediately above. The program is initiated at the Start box 100 prior to any movement of the automatic door, that is, where the automatic door includes a displaceable door panel, prior to each movement of the door panel. The initiation of the program prior to each displacement of the door panel can be triggered by one of a number of events, for example, the tripping of a sensor (e.g., a light sensor, a pressure sensor, a capacitance sensor, etc.) to indicate that an individual is attempting to pass through the automatic door.

At 102, the desired current value $I_{Desired}$ is set by the microprocessor to a value that is greater than the maximum allowed motor current during normal operation $I_{Max}$, and the drive motor is energized at 104. The actual value of the motor current $I_{Actual}$ is determined (i.e. measured) at 106, and at 108 the program branches dependent upon whether $I_{Actual}$ is greater than $I_{Max}$. If $I_{Actual}$ does not exceed $I_{Max}$ at this particular time, a determination is made at 110 as to whether the first time period $t_1$ has expired. If the first time period $t_1$ has not expired, then the program loops back via branch 112 for another measurement and comparison of $I_{Actual}$. If, however, the first time period $t_1$ has expired, then the actual motor current has failed to exceed $I_{Max}$ during the first time period $t_1$, and the program proceeds through branch 114 and a test negative box 116 to the end of the program, as a result of which the automatic door is at least temporarily disabled.

If, however, on one of the passes through this branch of the program, $I_{Actual}$ is determined to exceed $I_{Max}$, then, via branch 118, the program proceeds to 120 where the desired motor current $I_{Desired}$ is set to a value less than $I_{Max}$. By a procedure similar to that described above, it is determined whether $I_{Actual}$ falls to a value equal or below $I_{Max}$ during the second time period $t_2$. That is, $I_{Actual}$ is determined at 122 and compared to $I_{Max}$ at 124. If $I_{Actual}$ is less than or equal to $I_{Max}$, then via branch 126, a positive test result is registered at 128 and the program proceeds to the end at 130. In such case, the drive system has passed both portions of the test, and the automatic door is permitted to proceed with the upcoming operation, i.e., displacement of the door panel.

On the other hand, if at 124, $I_{Actual}$ has not yet fallen to a level equal to or below $I_{Max}$, then a determination is made at 132 as to whether the second time period $t_2$ has expired. If it has not, then the program loops back via branch 134 for another determination and comparison of $I_{Actual}$. If $I_{Actual}$ fails to fall to a value that is less than or equal to $I_{Max}$ during the second time period $t_2$, then via branch 136, a test negative result is recorded at 116, the program proceeds to the end 130, and the automatic door is at least temporarily disabled.

In the particular embodiments set forth herein, primarily the drive motor current is utilized as the parameter that is tested and compared to ensure that the drive system is operating correctly. However, those of ordinary skill in the art will appreciate that other system parameters (or "characteristics") could be measured and used to determine whether the drive system is operating correctly, for example, the speed or torque of the drive system or door could be the system characteristic measured and compared to desired values. Additionally, the Counter EMF of the drive motor, the angle of the door panel, door velocity, pressure, resistance, inertia, and moment of inertia are characteristics which might be employed.

One interesting aspect of the invention is the introduction of a step function (e.g., a sharp discontinuous rise or drop in a system characteristic or parameter value) into the drive system. Such a step function is often referred to as a "Delta" or "Dirac" Function and can be utilized in a transform between the time and frequency domains. The step function can therefore be utilized to determine various system conditions, and the present invention is seen as having application in the introduction of a step function for the determination of such system conditions. Discussion of the Dirac or Delta Function is to be found in "Introduction to the Design of Servomechanisms", by John L. Bower and Peter M. Schultheiss, published by John Wiley & Sons (1958), for example, at pages 30–31, and in "Theory of Servomechanisms", by H. M. James, N. B. Nichols and R. S. Phillips, Radiation Laboratory Series, Vol. 25, p. 30, McGraw-Hill Book Co. (1947), both of these publications being hereby incorporated by reference herein.

In one embodiment, the drive motor characteristic which is to be stored in a non-volatile memory element can preferably consist of the relationship between the duty cycle supplied to the drive motor (or, in another embodiment, the voltage supplied to the drive motor) and the corresponding drive motor current produced thereby. Such a characteristic, which is often presented in the form of a graph (e.g., a line graph) or a tabular result, can preferably be stored in the non-volatile memory element as a lookup table. Such lookup tables are well known in the art and are described, for example, in U.S. Pat. Nos. 5,313,611; 5,216,439; and 5,301,364, each of these U.S. patents being hereby expressly incorporated by reference herein.

As discussed above, in one embodiment, the characteristic which is stored in the non-volatile memory element is the characteristic describing the relationship between the duty cycle or voltage of the drive motor and the resulting drive motor current, assuming correct operation of the automatic door, and the operating characteristic which is determined and compared to such stored characteristic is the actual drive motor current during the test. Current sensors for measuring currents that may be used in conjunction with this aspect of the invention are disclosed, for example, in U.S. Pat. Nos. 5,180,970; 5,187,653; and 5,179,340, each of these U.S. patents being hereby expressly incorporated by reference herein.

Non-volatile memory elements that may be used are described in U.S. Pat. Nos. 5,190,887; 5,185,718; and 5,194,929, each of these U.S. patents being hereby expressly incorporated by reference herein.

The relationship of the Dirac delta function is discussed above. Examples of use of the Dirac delta function are discussed in U.S. Pat. Nos. 5,184,079; 5,255,212; and 4,646,323, each of these U.S. patents being hereby expressly incorporated by reference herein.

Some examples of revolving automatic doors which employ a drive motor and which may be employed are disclosed in U.S. Pat. Nos. 5,187,895; 5,201,142; and 5,235,783, each of these U.S. patents being hereby expressly incorporated by reference herein.

Some examples of sliding automatic doors which employ a drive motor and which may be employed are disclosed in U.S. Pat. Nos. 5,247,763; D347068; and 5,325,628, each of these U.S. patents being hereby expressly incorporated by reference herein. Nomenclature Used in FIGS. 3 and 4:

1a. Setpoint selection
2a. Drive motor start
3a. Measurement of the motor current
4a. Time base $t_1$
5a. Setpoint comparison
6a. Instantaneous value of the motor current
7a. Time base $t_2$
8a. Test evaluation
9a. Test negative
10a. Selection element
11a. Selection element
12a. Feedback loop
13a. "Lower actual value" report
14a. Feedback loop
15a. Test reporting element
16a. Test reporting element
17a. Command element
18a. Command element
19a. End of test 20a. Start command
21a. Time $t_1$
22a. Time $t_2$
23a. Curve of actual value of motor current
24a. Setpoint selection
25a. Test phase
26a. Maximum allowable motor current There is disclosed below a method for the closed-loop control of an automatic door which is propelled by a drive motor, in which the movement cycle, i.e. the beginning and the end, is activated by a continuous signal or at least one sensor signal. The door in question can be one of the following types, for example: sliding door, curved panel sliding door, folding door, three-panel folding door, revolving door, etc. and is equipped with a programmable electronic control unit which contains a microprocessor. Since people travel through the above-mentioned types of automatic doors, it is important to guarantee a maximum degree of safety for these doors, namely so that the doors pose no risk of trapping people between the edges of the door panels which move toward one another as they close. These risks can include, for example, situations in which the persons using the door can become jammed between the edges of the panels, or situations in which they can be injured by an excessive force generated by the door propulsion system between the edge of the door and the edge of the opposite surface. Therefore it is necessary to guarantee the safety of such closing operations, which can of course be accomplished by installing a complex and expensive system of sensors, or also by adopting measures which limit and monitor the force of the propulsion unit. This force limitation can be achieved, for example, if the power of the drive system is so weak that the drive motor is unable to exceed a specified force, but such a limitation results in an unsatisfactorily slow movement of the door panels.

European Patent Application 0 468 361 suggests a system which limits the closing force on the closing edge of a moving element. By means of a redundant system of measurement circuits, and in addition to the motor current which is measured by means of a measurement resistance, the setpoint of the maximum motor current is transmitted to redundant measurement systems, where it is processed. When a specified motor current is exceeded, a shutdown pulse is transmitted to the electronic control system of the drive. The system is reliable and/or fail-safe and inherently safe, on account of the redundant realization. Another European Patent Application 0 548 505 discloses a method and an apparatus for the determination of the dynamic mass of elevator doors. This method can be used at any closing speed to determine the corresponding kinetic energy of the door panel, thereby making it possible to define the kinetic energy of the door panel, and to analogously determine the kinetic energy on the closing edge. Conversely, on the basis of the kinetic energy determined, this system makes it possible to specify a maximum allowable closing speed which lies in the allowable range for such doors.

German Patent No. 42 06 272 A1 suggests a starting method and an apparatus for the operation of a controlled and/or an uncontrolled sliding or swinging door. In this method, the parameters are determined by the intelligent control system of the door itself once, at the beginning of operation when the door is turned on, and are then stored in a non-volatile memory.

German Laid Open Patent Application No. 39 21 158 discloses a drive apparatus for opening and closing an articulated door. This system includes a control device which limits the motor current on the basis of stored maximum setpoints for the motor current. These maximum setpoints thereby correspond to the maximum allowable door closing forces. Changes in parameters caused by factors of any type are not taken into consideration.

There is provided a method and an apparatus by means of which a permanent limitation of the closing force between the primary and secondary closing edges of door panels of a door system can be achieved in an economical manner. In addition, the door must be self-monitoring, i.e., the method must be automatically verified in a specified rhythm. The invention teaches that this object can be achieved if a continuous comparison is made between the measured motor current and the motor characteristic stored in a programmable electronic control unit, on the basis of a sequential program. The sequential program guarantees the maximum degree of safety for the persons using the door.

The switched mode power supply which corresponds to such a drive system is generally capable of generating a greater force than is allowable on the primary closing edge. Powerful switched mode power supplies are therefore used, so that the movement of the door panels can be completed in a reasonable length of time, i.e. it must be possible for such a door to open in a reasonable length of time.

The motor current is a parameter for the power of the connected drive motor. The determination of the motor current and thus the determination of the characteristic of the connected drive motor is a value which is representative of the torque this motor can generate, and is therefore a specific value. The motor current can either be determined by a programming process, or the system can measure the current itself by means of a measurement or a calculation of the internal resistance of the motor, since the current operating voltage is a known quantity. The known or determined values are stored, for example, in an $E^2$-prom (EEPROM). Within a specified length of time, the door tests itself automatically every time it moves, namely in the limit positions, i.e., when the door panel is in the closed or open position, to determine whether the allowable force on the primary or secondary edges is being exceeded. Such a test sequence can proceed as follows:

The setpoint for the motor current is set to a value which is greater than the maximum allowable stored value.

The motor is started.

Is the current of the motor at the value of the maximum allowable current?

Has the maximum time base $t_1$ elapsed?

The measured value is set to a value which is less than the maximum allowable setpoint.

Is the measured value at a value which is below the maximum allowable setpoint?

Has the maximum time $t_2$ elapsed?

Test positive.

Test negative.

By means of the first setpoint step-change in the opening direction when the motor is turned on, current flows through the drive motor and the motor current reaches a limit which is greater than the maximum allowable actual value. This limit is reached in the first few centimeters of the opening phase. The setpoint is then reduced, which results in a reduction of the motor current to a point which is less than the limit value. This entire process must be completed within a specified period of time. If an error occurs, the error is reported, and the door is immediately and automatically switched into a safe status. The invention is explained in greater detail below with reference to one possible embodiment which is illustrated schematically in the accompanying figures.

On the basis of a sequential program which is stored in the memory which is part of the microprocessor, the system guarantees that the motor current may not exceed a maximum specified value. The magnitude of the motor current is a measurement which is representative of the force which can occur between the primary and secondary closing edges of an automatic door. For example, a sequential program can be designed so that in the startup phase, current is applied to the drive motor by means of a control command. As noted above, the connected power supply which is responsible for supplying power to the drive motor is generally sized with some reserve capacity or oversized so that the door panel, which is quite heavy, can be placed in motion quickly. Thus the motor can be optimally accelerated as a function of its torque characteristic without exceeding the allowable force. But at the same time, the motor current is measured continuously, and on the basis of the sequential program, the motor current is reduced at the point where the excess current occurs outside the specified time base. Because the setpoint is reduced, the measured value of the motor current is also simultaneously reduced, and thus there is a reduction in the force which occurs. If the motor current were to increase above the maximum allowable value while the door was in operation, the drive would be shut down by means of a second disconnect system. This feature guarantees that the door panels pose no danger to the persons using the door.

Frequently, one and the same open-loop control unit, and thus also the closed-loop control unit, is used for different types of doors, which means that the motor which is connected will be different, as a function of the weights of the door panels in question or the requirements of the specific site. For this reason, the motor characteristics must be stored in a non-volatile memory, which can be an $E^2$-PROM, for example. But it is also possible that the door system can use its intelligent capabilities to measure the motor characteristics by means of a learning cycle, and the values determined during this learning cycle are also stored in a non-volatile memory, where they can be called up and processed by the microprocessor which is part of the system. In addition to the measurement of the motor characteristics and thus of the motor current, the motor voltage is also measured. It thereby becomes possible to have all the characteristic data of the drive motor stored, on the basis of the characteristic of the motor.

The is also disclosed a method which makes it possible, on the basis of a specified, selectable time interval, to guarantee that the drive is tested to verify that the maximum forces on the primary and secondary closing surfaces are within parameters. Referring again to the flow diagram of FIG. 3, a starting command 20a is given which activates the setpoint selection 1a. The setpoint selection 1a specifies the maximum allowable motor current, which lies above the allowable current for normal operation. This maximum allowable motor current is in turn stored in a non-volatile memory, after it has been measured in a learning cycle or after it has been programmed. If the setpoint of the motor current is below the maximum allowable value, this value is transmitted by means of the selection 10a to a subroutine which performs the setpoint comparison 5a. The setpoint of the motor current is reprocessed in an actual value comparison element 6a. If the actual value is greater than the allowable value, by means of the message "lower actual value" 13a, this fact is forwarded to the "test negative" evaluation element 9a. Because the test has produced a negative result, a command 18a goes to the end of the test program 19a. If a time has been specified, this test can then be repeated either immediately or at a later time, depending on the customer's requirements. But if the current of the motor is at a value which is less than the maximum allowable value, this current is transmitted by the sequential program to the time base 7a $t_2$. If the total amount of time required for the sequence is within the specified time $t_2$, this fact is reported to the test evaluation element 8a by means of the test report element 15a. The test evaluation element 8a indicates that the test has been conducted with a positive result, and thus the drive is operating within the requirements. This fact is then reported via the command element 17a to the end of the test 19a. It is necessary to repeat the test at a later time. But if the motor current is on a level which is higher than allowed, this fact is reported by means of the time base 7a and the feedback loop 14a to the actual value element 6a of the motor current. But if the motor current is reduced within the period $t_2$ of the time base 7a, then as described above, a positive test result is reported. If the drive is not capable of keeping the motor current within the specified limits in the specified length of time $t_2$, then this fact is reported to the program by means of the actual value element 6a and the reporting element 13a as a negative test result 9a. There is another branch of the program, in which the detection of the motor current 3a at a level which is below the allowable value is reported by means of the selection element 11a to the time base 4a $t_1$. If the time has not yet elapsed, this fact is reported by means of the test reporting element 16a to the test evaluation element 8a as a positive result of the test. But if the test is negative within the time base 4a, this fact is reported via the feedback loop 12a to the motor current measurement element 3a, so that a decision can be made by the program between a positive or a negative test within the specified time. Referring again to FIG. 4, the lower curve, shows the curve of the actual value of the motor current 23a over time, and the upper curve shows the setpoint selection 24a of the motor current. The motor current is controlled on the basis of a pulse width modulation. In the test phase 25a, as illustrated in the flow chart in FIG. 3, the drive is tested at is maximum possible power, i.e. at the maximum attainable force between the primary and secondary closing surfaces. In the curve of the measured motor current 23a it is clear that the entire test must take place in the periods $t_1$ 21a and $t_2$ 22a. This curve also shows that the maximum motor current for the period 22a lies above the maximum allowable motor current 26a. The distance travelled by the door panels during this period is negligible. As a result of the program sequences described above, it is clear that the invention has created a method which makes it possible to simply and economically regulate the motor current and keep it within specified ranges.

Figure 6:
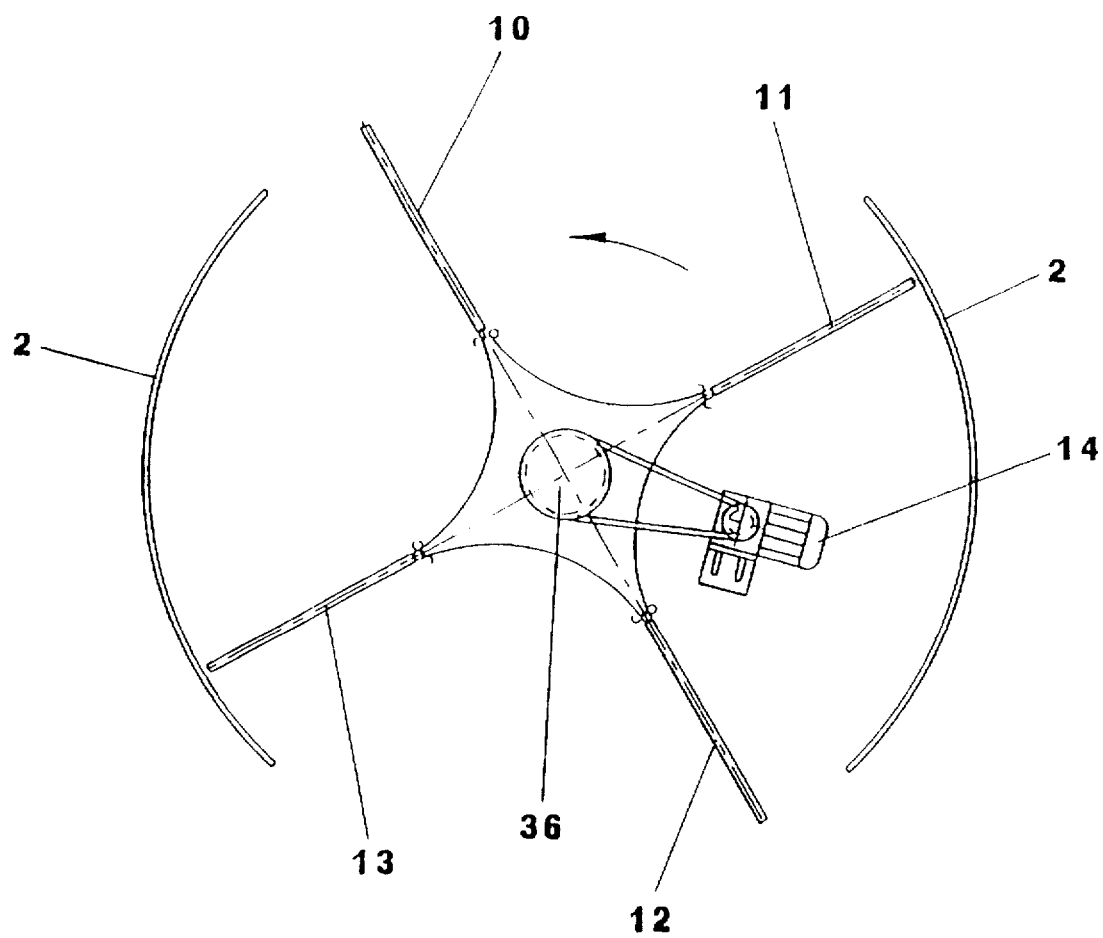
FIG. 6 shows a revolving door in an overhead view.

FIG. 6 is a schematic illustration of a revolving door, in an overhead view. Between two drum walls 2, there are panels 10, 11, 12 and 13 of the revolving door which are fastened rotationally at a center point. The panels 10, 11, 12 and 13 are connected to a drive motor 14 by means of a drive wheel 36. To set the panels 10, 11, 12 or 13 in motion, a pressure must be exerted by at least one person on at least one of these panels. Since the pressure or the force is proportional to the velocity, for purposes of simplicity, in the following embodiment, reference is made primarily to the velocity. The increasing peripheral velocity of the panels 10, 11, 12 and 13 of the revolving doors follows a quasi-ascending ramp during the startup phase 8, as shown most particularly in FIGS. 7 and 8. The actual velocity 15, which increases from zero to its final value and is initiated by manual contact, continues to increase as long as the person continues to exert a higher pressure on one of the panels 10, 11, 12 or 13. As the panels 10, 11, 12 and 13 begin to revolve, the velocity is determined by a peripheral velocity measurement device 34 (shown in FIG. 12), e.g., by means of an incremental sensor or a tachometer generator. The actual velocity is thereby measured cyclically, whereby the cycle time is adjustable. At the same time, an open-loop/closed-loop microprocessor control system 32 is informed by means of a velocity monitor/detector 31 of a door activation system 30, that the door panels 10, 11, 12 and 13 are no longer stationary. The velocity measurement device 34 then reports any change in the velocity to the velocity monitor/detector 31 and thus to the open-loop/closed-loop control system 32. This signal is an indicator that the drive motor 14 must be activated by means of a drive unit 33 of the open-loop/closed-loop control system 32, because the system does not require the person operating the door to reach the actual speed alone and thus to apply all the force required. A power assist (37 in FIG. 7 and 16 in FIG. 8) is thereby preferably realized by means of a pulse width modulation, which follows the curve of the actual speed 15 of the force exerted manually in specified steps. But in any case, continuous contact with the panel of the revolving door must be maintained. If the velocity of the door panel increases, the level of the power assist 16 will also increase up to a maximum value.

When a revolving door of the type described above is initially actuated manually, it runs through a learning cycle, during which it measures all the necessary parameters of the door and stores them in a non-volatile memory. One of these parameters is also the current absorbed by the drive motor 14. The current measurement device 35 thus continuously reports the instantaneous current absorbed by the drive motor 14 to the open-loop/closed-loop control system 32.

When no increase in the current speed 15 of manual operation is measured, the open-loop/closed-loop microprocessor control system 32 begins the phase of uniform motion. In this range, too, the power assist function continues to be provided, thereby boosting the speed at a level below the actual speed of the door panels 10, 11, 12, 13.

Figure 8:
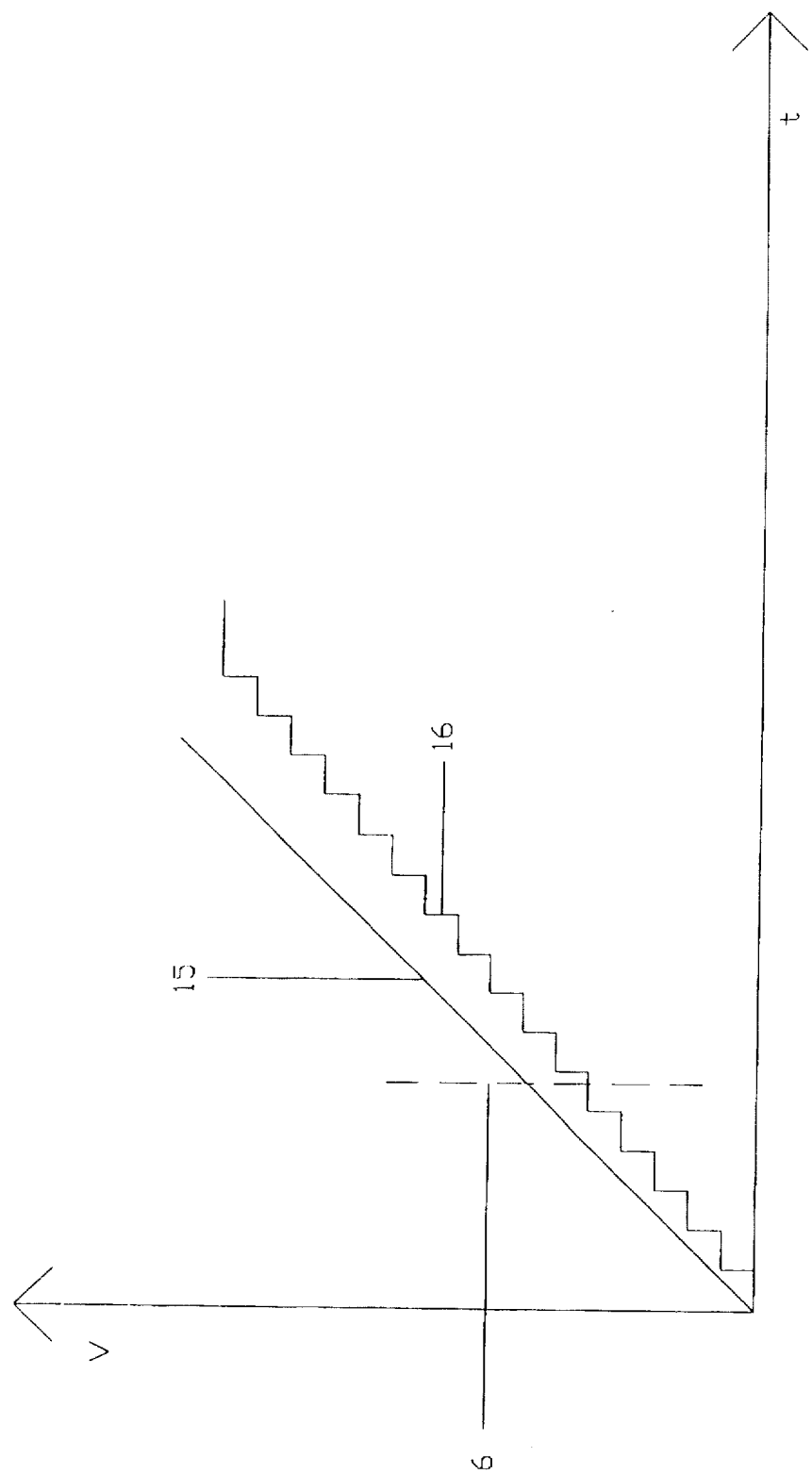
FIG. 8 is an ascending ramp (acceleration)
Figure 9:
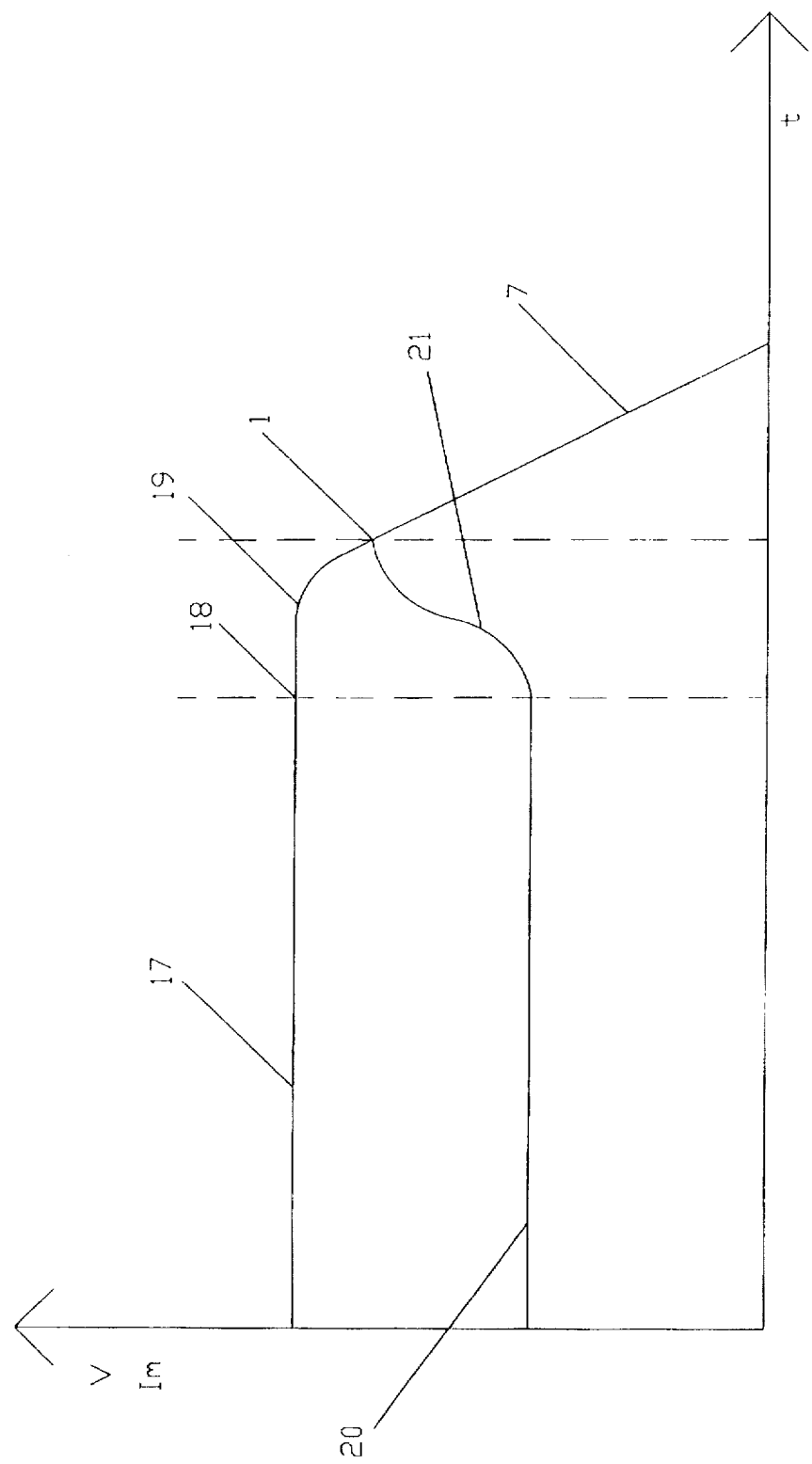
FIG. 9 shows continuous motion and the detection of the disconnect point.

This uniform motion is illustrated in FIG. 9, in which, in addition to the velocity over time, the motor current (Im) is also plotted over time. If the manual boost 17 is a uniform motion, then the magnitude of the motor current 20 is also uniform. If the motion is uniform, the velocity is continuously measured by means of the velocity detection device 34, and the current absorbed by the drive motor 14 is measured by means of the current measurement device 35. If the velocity of the door panels increases, an ascending ramp like the one illustrated in FIG. 8 is established. But there are also restrictions which are integrated in this mode of operation, which are specified by the determination of the parameters learned by the revolving door during its learning cycle. For example, if the current absorbed by the motor remains below a specified upper disconnect limit, the open-loop/closed-loop microprocessor control system 32 performs only a monitoring of this condition, because the remaining portion of the required current speed must be applied by the person using the door. But as soon as manual assistance is no longer being provided, i.e., if the manual assistance 18 were discontinued (as at 18 in FIG. 9), the system would detect a velocity decrease 19, which would in turn result in an increase of the current 21 absorbed by the motor. This increase of the absorbed current 21 is tolerated by the open-loop/closed-loop microprocessor control system 32 until there is an intersection 1 with the parameters learned by the system, which intersection 1 is specified by the program. If this point is reached, the disconnect limit of the motor current 21 is also reached, and after a specified disconnect recognition time, the motor is brought to a stop by means of a descending coasting ramp 7, shown in FIG. 10. This coasting ramp 7 imitates the normal coasting of a manual door, and like the startup phase 8, is preferably realized by means of pulse width modulation, e.g., by a series of current pulses of decreasing time duration. As a result of the detection of the fact the door is supposed to coast, the descending coasting ramp 7 is carried out, because even in the event of a direct disconnection of the drive motor 14, the motor would continue to turn as the door coasted to a stop, which would in turn be detected by the velocity detection system 34 as a repeated passage of persons through the door, although that would not be the case. On the basis of this method of operation, the sequence of motions is realized just as in a manual door. If the door is no longer contacted by a person, after the decrease of the total energy of rotation, the door comes to a stop. The door can only be reactivated from the starting position 29 by setting the panels 10, 11, 12 and 13 in motion, which is in turn detected by the door activation system 30 and reported correspondingly to the open-loop/closed-loop microprocessor control system 32. This illustrates that the servo assist is realized only in response to the exertion of a manual force, i.e., contact with one of the door panels 10, 11, 12, 13. The servo assist is thereby permanently monitored by the control software. As a result of this method of operation, it becomes clear that the sequence of motion in the servo mode of such a revolving door corresponds to the manual operation of the door, and thus does not require any system of safety sensors for the person operating the door.

On account of the method of operation described above, it is apparent that a different pressure or even tension on one of the door panels will be detected by the velocity measurement device 34 and also by the current measurement device 35, and this interaction will be reflected either in a startup phase 8 or in a coasting ramp 7. It is thereby apparent that a change in velocity, but only an increase, is an indicator for the open-loop/closed-loop microprocessor control system 32 to once again increase the peripheral velocity. On the other hand, the current measurement is required to more precisely detect the disconnect point.

Figure 7:
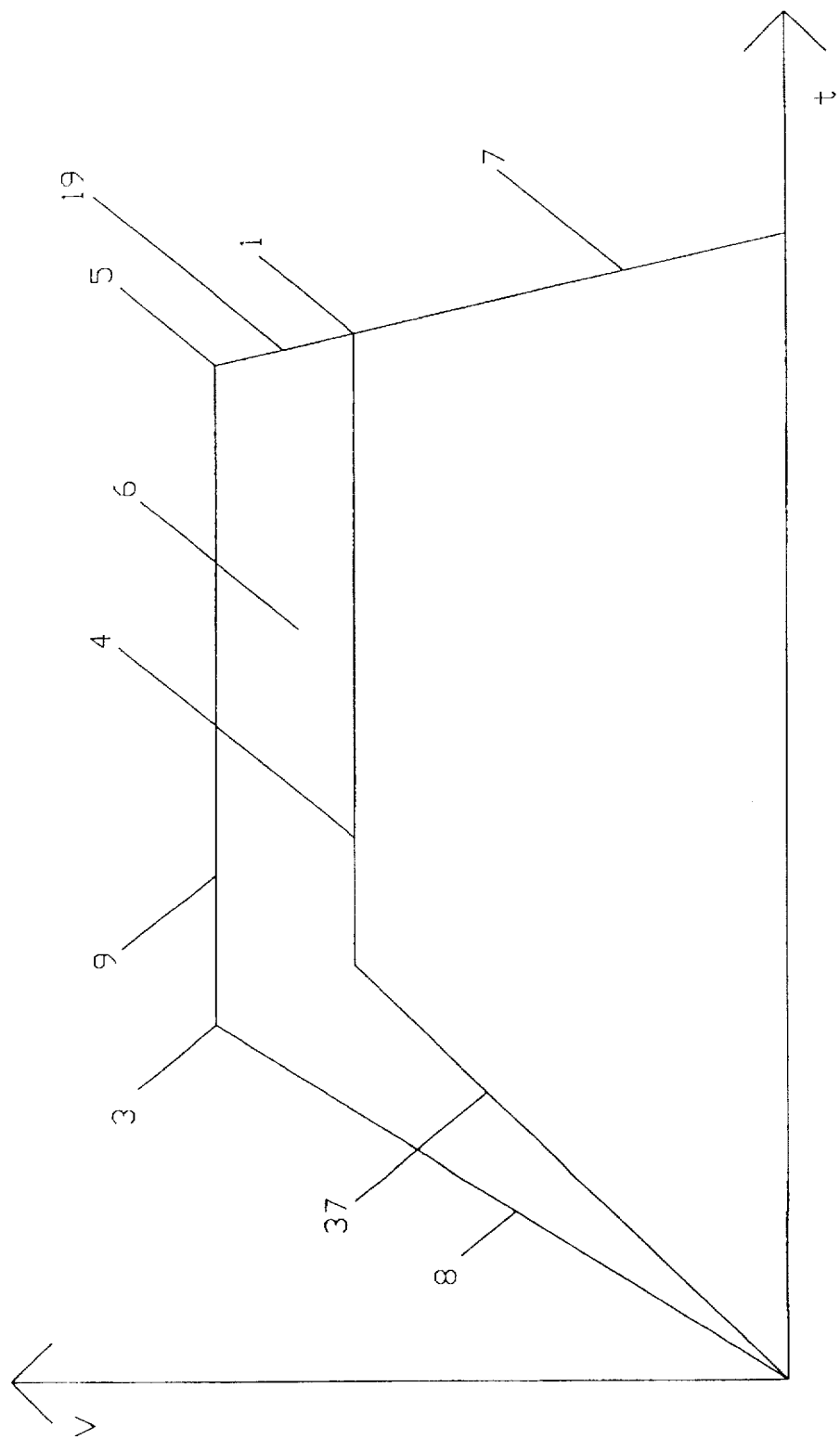
FIG. 7 is a diagram of velocity/time.

In the diagram in FIG. 7, which shows the velocity plotted over time, the start-up phase 8 is presented in the front area. With a certain lag, this start-up phase 8 follows the power assist 37 provided by the motor up to the point where the curve is deflected into the uniform velocity 3. At the total velocity 9 it is apparent that the booster velocity 4 is always less than the total speed, and thus the velocity difference 6 Δv is the component of the velocity which must be supplied by the person using the revolving door. If the uniform velocity ceases at point 5, i.e., if contact with one of the panels 10, 11, 12 or 13 of the revolving door is interrupted, there is a decrease 19 in the velocity, and at the instant the open-loop/closed-loop microprocessor control system 32 recognizes that this is a coasting ramp 7, the ramp is run according to the program, because the current 20 absorbed by the motor increases on account of the absence of contact with the door panels, and thus the drive motor 14 must keep the door panels 10, 11, 12 and 13 in rotation all by itself. But since the drive motor 14 need not supply the total peripheral velocity, on account of the control program, the coasting phase enters the coasting ramp 7.

Figure 10:
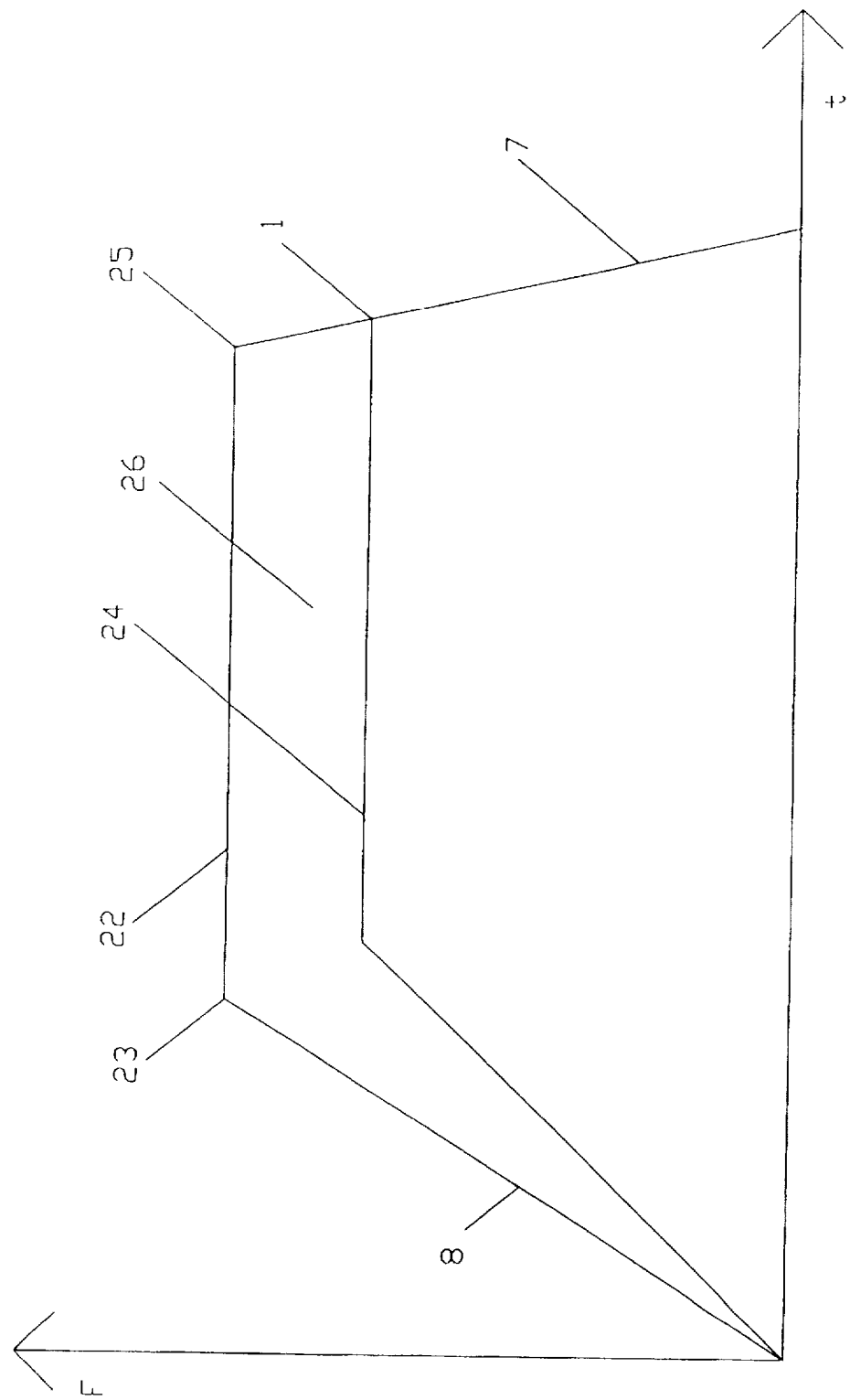
FIG. 10 is a diagram of force/time.

In addition to the criterion of velocity as a control parameter, however, the force can also be measured, as illustrated in the diagram in FIG. 10. FIG. 10 illustrates the force to be applied plotted over time. During the startup phase 8, the force increases over time at a constant rate, until a uniform force 23 is exerted by one of the persons on the panel of the revolving door. The total force 22 is thereby composed of the booster force 24 supplied by the drive motor 14 and the differential force 26 which must be supplied by the person. As with the consideration of the velocity, in this case, too, on account of the proportionality between force and velocity, when the force 25 ceases, there is a reduction of this velocity, and thus under the control of the sequential program, the revolving door with its revolving panels 10, 11, 12 and 13 makes the transition into the coasting ramp 7. For this application, it is also possible to take a measurement of the force directly on the door panel, e.g., using strain gauges.

Figure 11:
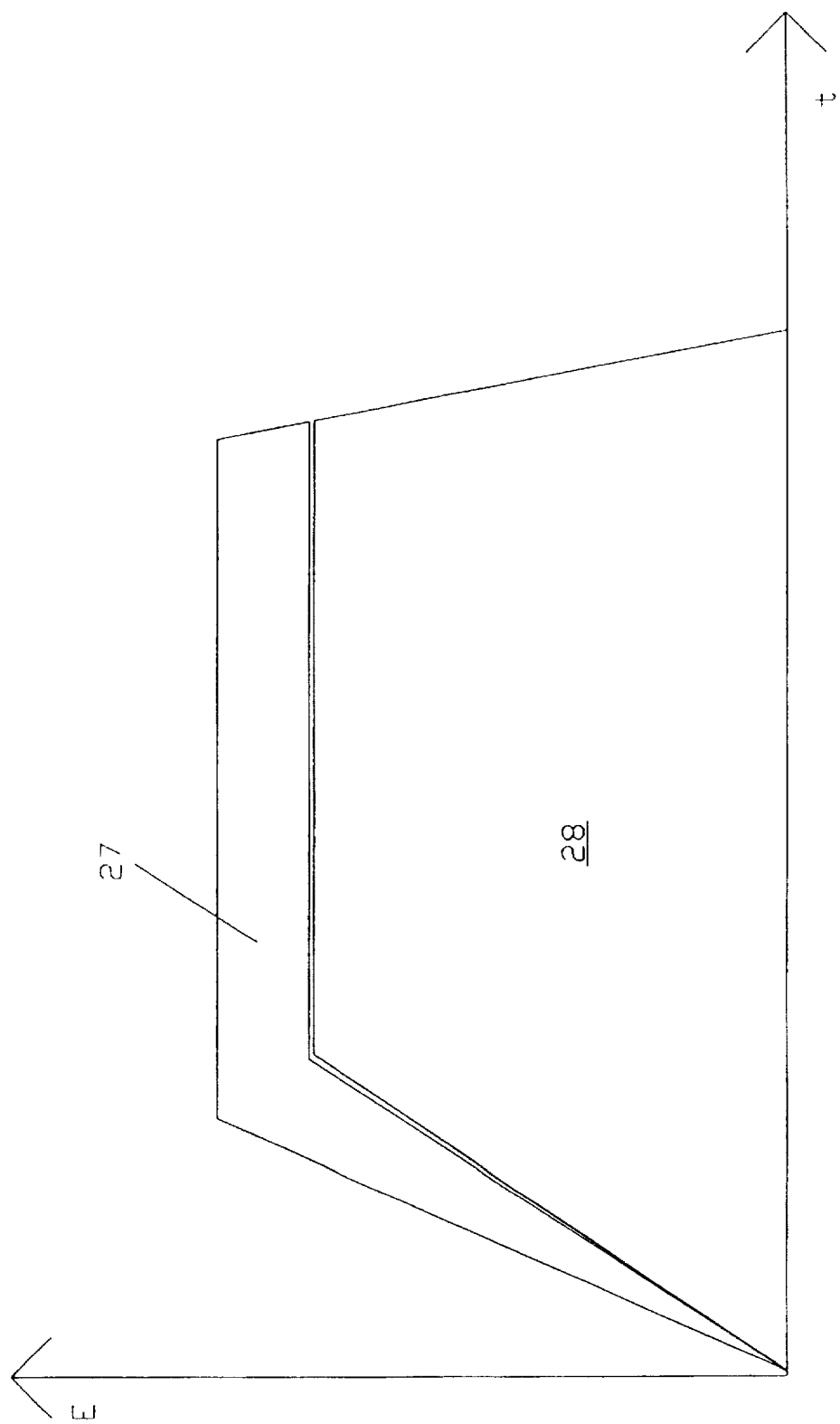
FIG. 11 is a diagram of energy/time.
Figure 12:
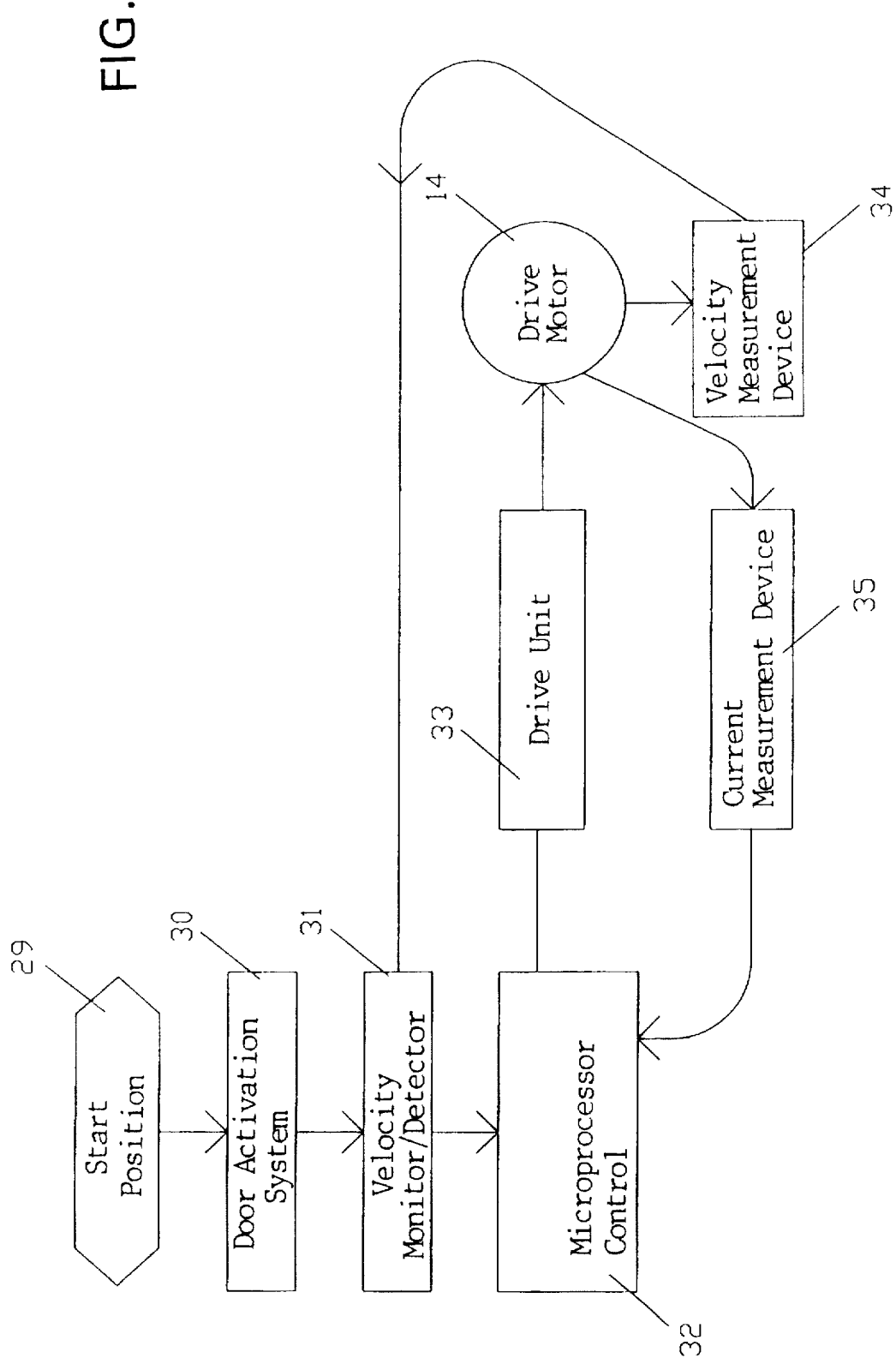
FIG. 12 is a block diagram of a drive motor control unit.

On account of the computer program used, the open-loop/closed-loop microprocessor control system 32 is also able to calculate the energy contents. This situation is illustrated in FIG. 11, where the kinetic energy is plotted with respect to time. The maximum kinetic energy which must be supplied for the operation of the revolving door is supplied by the motor energy 28, whereby the manual energy 27 required is significantly less.

While the above embodiment has been described as one in which either a user applied force or a user imported velocity is sensed by the control circuit, in another embodiment, various other methods can be employed to sense the presence and/or movement, such as, for example, proximity detectors, a change in capacitance, etc.

Figure 13:
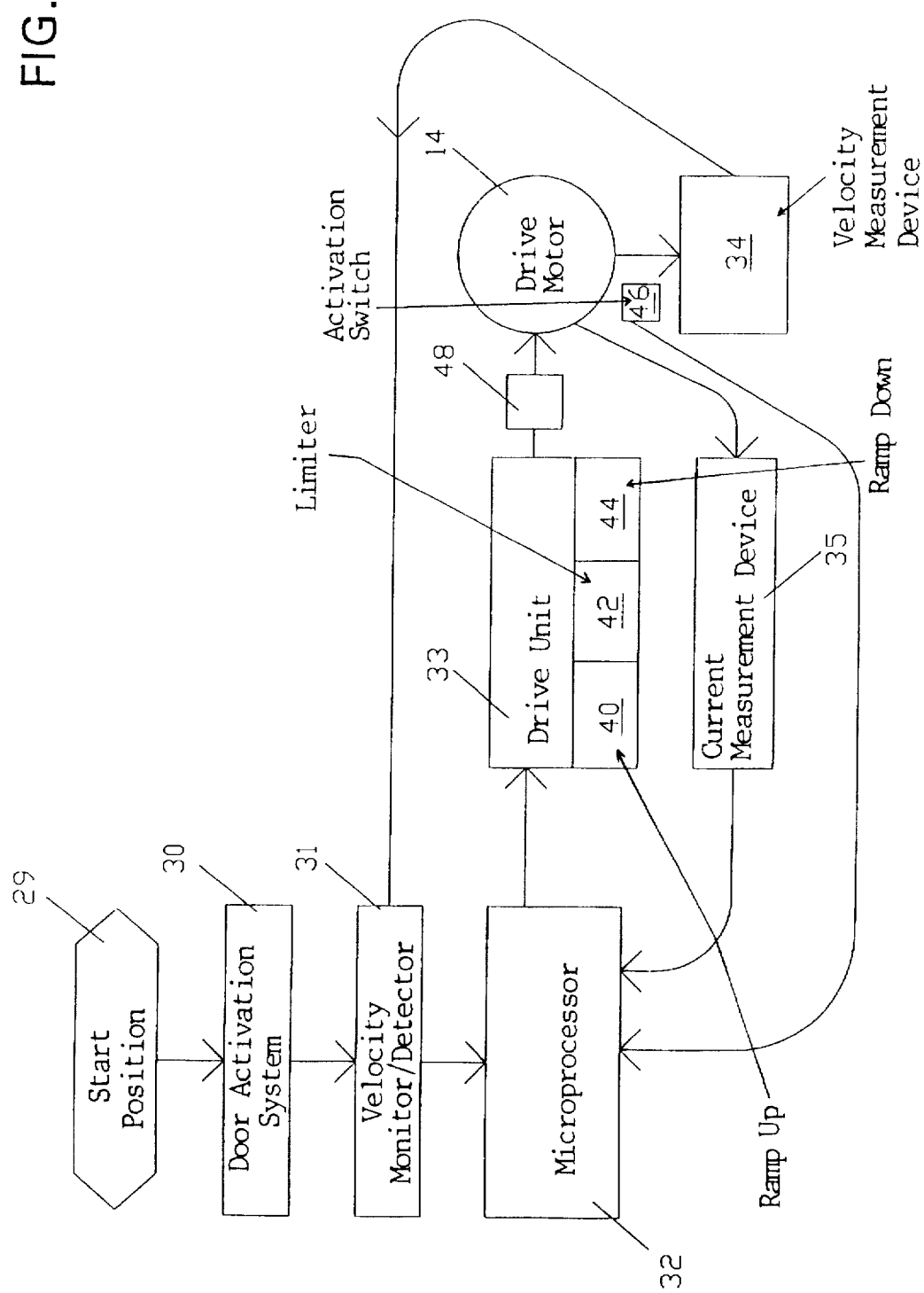
FIG. 13 is also a block diagram, however illustrating a drive motor control in more detail.

FIG. 13 shows additional control elements which may be included in one embodiment. There, the drive unit 33, which controls the drive motor 14 may include control circuitry (e.g., either hard wired or in the form of portions of the program executed by the open-loop/closed-loop microprocessor control system 32) as follows:

- a ramp up control circuit 40 which, upon sensing either user imported velocity of the door panels 10, 11, 12, 13, causes the drive motor 14 to be operated so as to increase the drive torque supplied during an initial limited period of time of increasing rotational velocity;
- a limiting circuit 42 which limits the torque supplied by the drive motor 14 to the revolving door so that it does not exceed a specified parameter of movement (e.g., rotational velocity, kinetic energy, etc.); and
- a ramp down control circuit 44 which serves to operate the drive motor 14 so as to decrease the torque supplied to the revolving door during a limited terminal period of time during which the rotational velocity of the revolving door is decreased.

In one embodiment, the ramp down control circuit 44 may include circuitry for causing the rotational velocity of the revolving door to decrease in a manner which closely resembles the natural coasting to a stop of a non-powered revolving door. This may be implemented, for example, in the form of a so-called "look up table" in memory (e.g., ROM), where the microprocessor control system 32 uses a measured parameter (e.g., velocity) to access data stored in the memory to operate the drive unit 33 such that the revolving door appears to coast to a natural stop.

Also shown in FIG. 13 is an initial activation switch 46, the state of which, in one embodiment, is determined by the microprocessor control system 32, which operates to supply torque to the revolving door only if the initial activation switch 46 has been actuated, regardless of whether any user applied force or user imported velocity has been detected.

Figure 14:
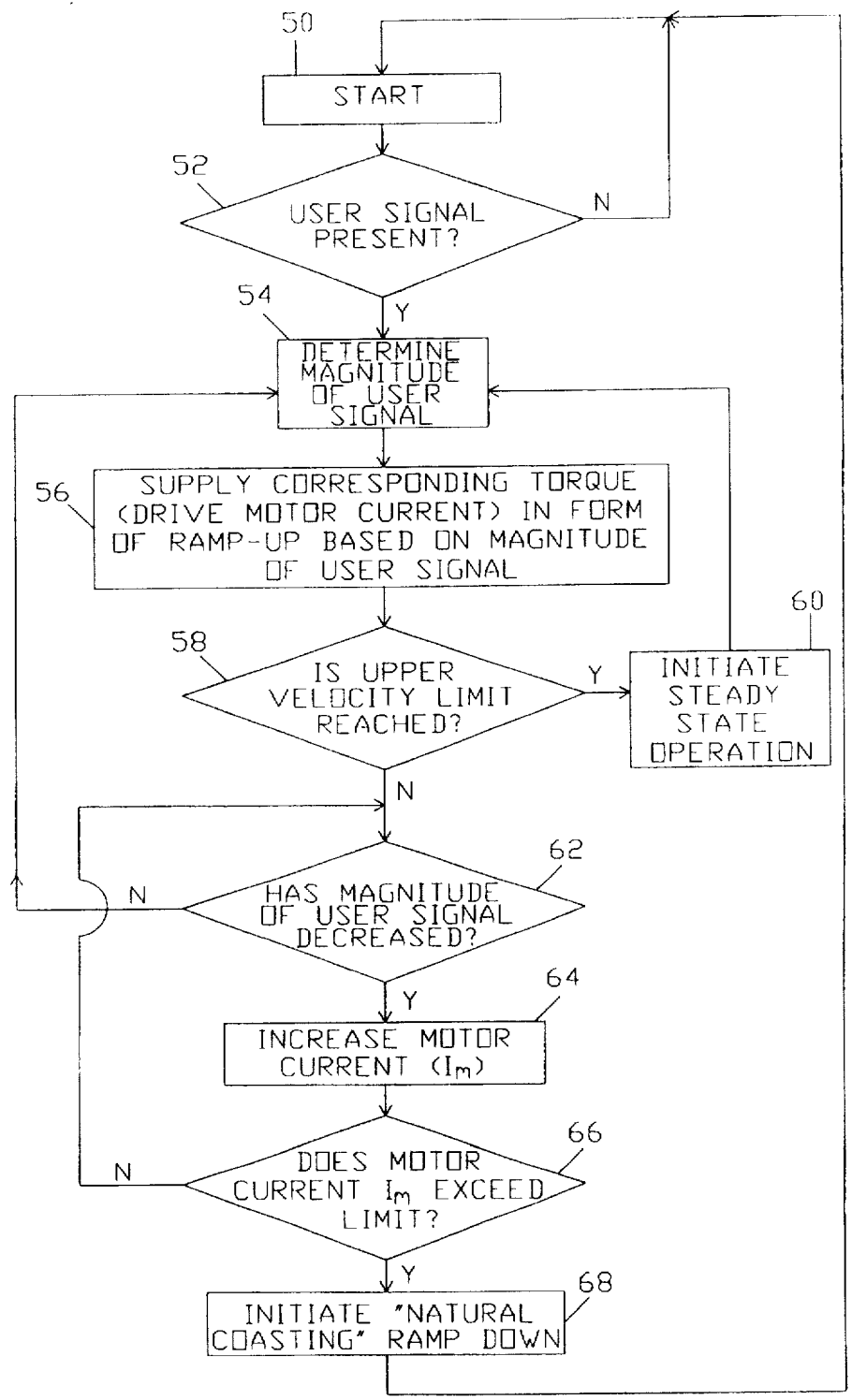
FIG. 14 is a flow chart illustrating the operation of an open loop/closed loop microprocessor control system.

FIG. 14 is a flow chart illustrating the logic employed by the microprocessor control unit 32 in controlling the rotational torque supplied by the drive motor 14 to the revolving door. Upon start up 50 of the control program, the microprocessor control unit 32 determines whether a User Signal, that is, for example, either a user applied force or a user imparted velocity. Upon detection 52 of a User Signal, the microprocessor control unit 32 determines the strength or magnitude of the User Signal (at 54) and, at 56, supplies a rotational torque, in the form of drive motor current (Im) which corresponds to the magnitude of the User Signal, for a higher User Signal, more drive current (Im) being supplied. Additionally, during this stage of operation, the drive current (Im) is supplied in the form of a ramp-up (i.e., substantially steadily increasing velocity profile that closely parallels but is always less than the total rotational velocity of the revolving door. The appropriate velocity profile can be easily determined, for example, by accessing an emperically determined look-up table, etc.

The microprocessor control unit 32 determines (at 58) whether the rotational velocity of the revolving door has reached a specified upper limit: if so, a steady state operation is initiated at 60; and if not, the microprocessor control unit 32 determines whether the magnitude of the User Signal has decreased at 62. From both the steady state operation 60X 60 and the No output of the decision 60X 62, the control program returns to determining the magnitude of the User Signal (at 54).

Upon a Yes determination from the decision 60X 62, the control program at least temporarily increases the drive motor current (Im) by a rather small amount (at 64), in the event the User needs additional assistance. The microprocessor 32 then determines whether the motor current (Im) exceeds a specified limit (at 66). If not, the control program Jumps back to the input of decision box 62. If the drive motor current (Im), the control program initiates (at 68) a ramp down velocity profile, which preferably substantially corresponds to the decreasing velocity profile of an ordinary manual revolving door. During the ramp down period, the microprocessor also jumps back to decision box 52, so as to detect any new User Signal.

On the basis of the embodiments and the various measurement types and methods described above it is apparent that a revolving door can be operated according to the method disclosed above without any system of safety sensors for the persons using the door. The peripheral velocity of the door panels 10, 11, 12 and 13 is determined solely and exclusively by the person using the door, i.e., if there are several persons in the individual spaces between the panels, the person who exerts the maximum force on the door panel in front of him determines the maximum speed of revolution of the door panels. But it is also possible that another person, for whom the peripheral velocity of the door panel is then too great, may exert a braking action, e.g., by pulling back on the door panel in front of him. Consequently, the overall peripheral speed of the door panels will be reduced.

On account of the requirement for constant contact on the door to be maintained by the individual persons using the door, this method of operation can be considered equivalent to a manual revolving door. Consequently, the safety sensor system which would otherwise be necessary can be eliminated.

With regard to the sensor system installed on a revolving door, a distinction must be made between a sensor system for the normal operation of a door and the safety sensor system. The operating sensor system can, for example, consist of a tachometer generator or an incremental sensor which measures the total velocity of the door panels. The safety sensor system is necessary for the safety of the persons who use a motor-driven revolving door. This type of safety system can consist of photoelectric barriers, infrared sensors, contact mats, sensor strips, radar devices, etc. All these safety sensors increase the cost of the revolving door enormously. With the operating method described above, it is therefore possible to eliminate all these sensors, while simultaneously guaranteeing safe operation of such a door, thereby presenting the operator with an economical alternative to a revolving door operated on the basis of known methods.

The activation of the door from a stop need not be realized only by pressing on the panels, but a person can also actuate a switch, button or sensor to set the door in motion. But in that case, it is generally essential to make contact with and apply pressure to one of the door panels 10, 11, 12 or 13, so that the force and thus the total velocity of the panels of the revolving door can be measured, so that the drive can provide power assistance.

Figure 15:
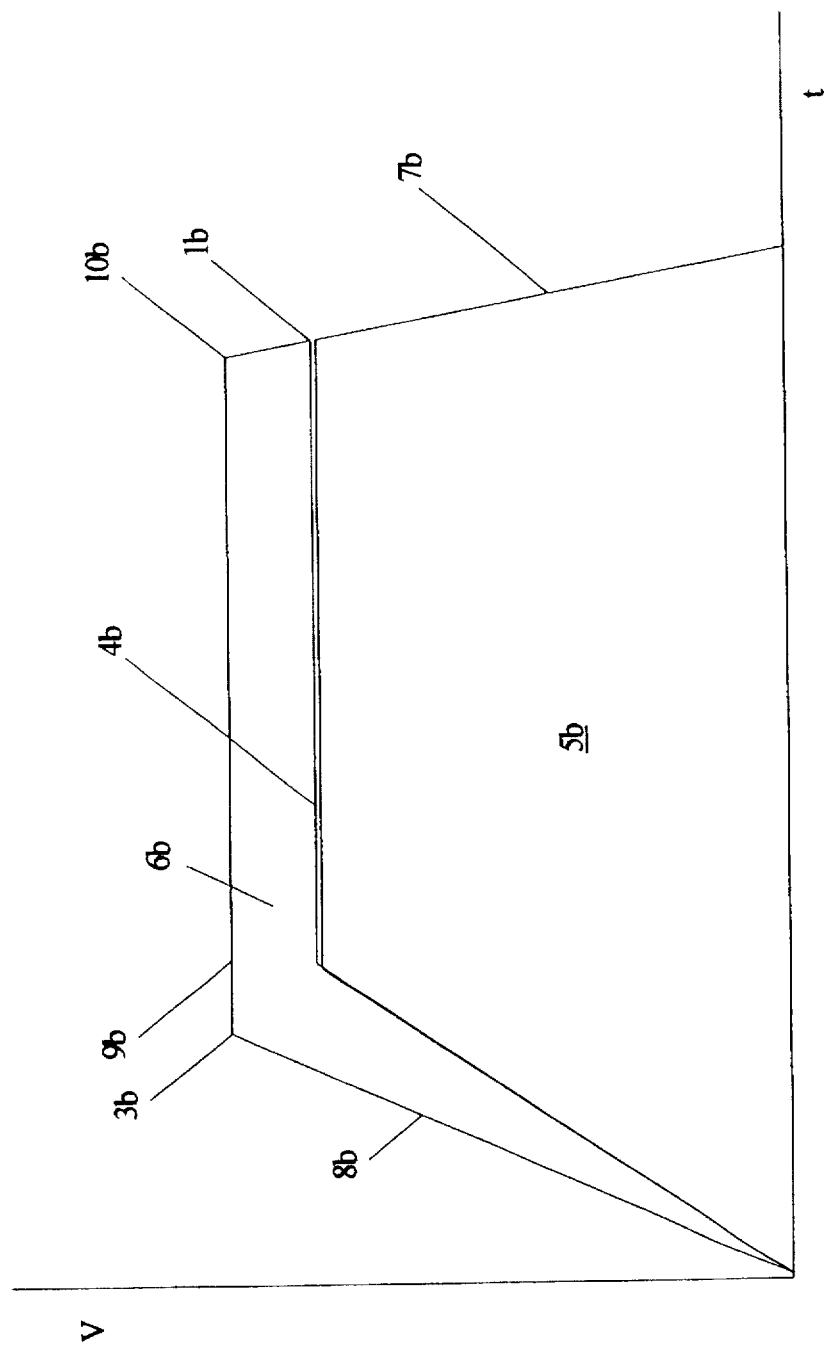
FIG. 15 is another velocity vs. time diagram.

FIG. 15 is a schematic curve of the velocity of the door panel over time.

As the result of a force exerted on at least one of the panels of the door, the door is placed in motion. On the basis of the startup ramp 8b stored in the open-loop/closed-loop microprocessor control system, the total velocity $v_m$ increases up to point 3b. The total velocity, however, does not consist solely of the velocity provided by the person operating the door, but also includes the velocity provided by the electric motor, which contributes its share to the total velocity $v_m$ with the curve 4b $v_u$. Only the remainder of the force, from the assistance velocity $v_u$ to the total velocity $v_m$, is the $\Delta v$ which must be supplied by the person. If the force applied by the person does not continue to increase, the curve makes a transition from the area of the startup ramp 8b into a uniform linear velocity of the revolving door panel, namely the velocity 9b. This velocity is maintained until, for example, force is no longer applied to the door panel. As a result of the discontinuation of the force, the total velocity $v_m$ decreases at point 10b, because the person is no longer assisting the motion. The lines of velocity 9b and 4b thus intersect at point 1b, and on account of the coasting ramp 7b stored in the open-loop/closed-loop microprocessor control system, the velocity of the door panel is reduced to zero. This deceleration according to the coasting ramp 7b imitates the deceleration of the panels of a purely manual revolving door.

If we consider the energy content of the areas underneath the curves, it is apparent that the kinetic energy provided by the drive system 5b is several times greater than the kinetic energy provided by the person 6b. Therefore the drive does not provide the full drive power, but only provides assistance.

On an existing revolving door of known characteristics, the $\Delta v$ is constant, and can be indicated, for example, as a percentage of the assistance velocity $v_u$ which must be applied manually, and is stored in a corresponding non-volatile memory, so that it can be processed by the selected program. Regardless of the assistance velocity of the door panel which must be provided by manual force, the assistance velocity of the electric motor is a fixed component of the total velocity, so that at low and high circumferential velocities of the door panel, there is always a velocity difference, and the door does not run away from the person using the door on account of the requirement of continuous pressure on the individual door panels. Following the brief startup phase, during which a greater force must be applied, a lower force is subsequently required to move the panels than is normally the case with revolving doors which are operated purely manually. Nevertheless the person pushing the door determines how fast the door panels should move.

The electric motor provides assistance for the instantaneous velocity, but the assistance velocity of the door is always below the manually required or desired speed of rotation of the door panel. This assistance mode makes the door easy to operate, because only a slight force has to be applied to actuate the door panel.

To start a stationary revolving door, as an alternative to the procedure described above, the door can also be actuated by means of a contact, switch, button, by the detection of force by means of strain gauges, or by another suitable electrical or electronic sensor system. But pressure must still then be applied to the door panel.

In this type of operation for a revolving door, it is necessary for the person using the door to maintain continuous contact with the door panel during the revolving motion of the door panel. If the direct contact is interrupted, the velocity of the door panel decreases, and it begins to coast to a stop. The coasting is produced by a deceleration curve or coasting ramp which is stored in a memory, and which imitates the coasting to a stop of a door which is operated manually.

When a constant force is exerted on the door panel, the door moves at a constant velocity. If this force is increased, thereby increasing the velocity, the $\Delta v$ in the component remains the same, i.e., greater assistance is provided by the electric motor. When the manual assistance decreases, the motor support begins to turn off.

A revolving door which is operated on the basis of the method described above can be operated without safety sensors for the persons using the door. The total velocity is determined solely and exclusively by the person using the door, i.e., if there are several persons inside the space between the door panels, the person who exerts the greatest force on his or her door panel determines the total velocity. But it is also possible for another person, for whom the total velocity is too high, to exert a braking action by holding back on the door panel in front of him, thereby reducing the total velocity of the revolving door. The teaching of the invention, in accordance with at least one preferred embodiment, is thus not only that the velocity of the revolving door is controlled on the basis of the velocity determined of the person using the door, but also that there must simultaneously be continuous contact between this person and the door panel. That should generally be considered the equivalent of a manually operated revolving door.

With regard to the sensor system installed on a revolving door, a distinction must be made between a sensor system for the normal operation of a door and the safety sensor system. The operating sensor system can, for example, consist of a tachometer generator or an incremental sensor which measures the total velocity of the door panels. The safety sensor system is necessary for the safety of the persons who use a standard revolving door. This type of safety system can consist of photoelectric barriers, infrared sensors, contact mats, sensor strips, radar devices etc. All these safety sensors increase the cost of the revolving door enormously. With the operating method disclosed herein, it is therefore possible to eliminate all these sensors while simultaneously guaranteeing safe operation of such a door, thereby presenting the operator with an economical alternative to a revolving door operated on the basis of known methods.

It is also conceivable that a person can actuate a switch, button or sensor to set the door in motion. But in that case, it is absolutely essential to make contact with and apply pressure to one of the door panels, so that the force and thus the total velocity of the panels of the revolving door can be measured, so that the drive can provide assistance.

Some examples of the pressure sensing apparatuses and/or strain gauges which may be utilized are to be found in U.S. Pat. Nos. 5,241,308; 5,191,798; 5,199,519; 5,287,757; 5,303,593; and 5,186,060, all of these U.S. patents being hereby expressly incorporated by reference herein.

Some examples of control systems which measure operating parameters and learn therefrom are disclosed in U.S. Pat. Nos. 5,191,272; 5,223,820; and 4,655,188, which U.S. patents are hereby expressly incorporated by reference herein.

Some examples of open-loop control circuits which may be incorporated are to be found in U.S. Pat. Nos. 5,210,473; 5,320,186; and 5,369,342, which U.S. patents are hereby incorporated by reference herein.

Some examples of closed-loop control circuits which may be utilized are to be found in U.S. Pat. Nos. 5,189,605; 5,223,072; and 5,252,901, which U.S. patents are hereby incorporated by reference herein.

Some examples of look up tables accessed by computers or microprocessors which may be employed are to be found in U.S. Pat. Nos. 5,284,116; 5,359,325; and 5,371,537, which U.S. patents are hereby incorporated by reference herein.

Some examples of power modifying systems which may be employed are to be found in U.S. Pat. Nos. 5,355,315; 5,224,564; 5,218,769; 5,255,755; 5,201,818; and 5,205,371, which U.S. patents are hereby expressly incorporated by reference herein.

There is disclosed below an operating method for the operation of a revolving door, the revolving panels of which are driven by an electric motor, and which is controlled and regulated in terms of its propulsion and revolution by a microprocessor open-loop or closed-loop control system respectively, but in which the electric motor does not apply the entire propulsion force, but only a portion of it, and the person who is passing through the revolving door must exert a force on the door in the form of continuous contact with the revolving door panel, which force is not applied by the electric motor, to maintain the speed of rotation of the revolving panel. The speed of rotation of the revolving panel is preferably measured by means of an incremental sensor. The revolving door panels, which are mounted centrally, are located inside two drum walls which, as a rule, are interrupted by entrances and exits which are located diametrically opposite one another. A conventional electronic safety system, e.g., sensors etc., is normally essential for the safe operation of such a revolving door.

For the panels of a revolving door which is propelled by an electric motor, a complex and expensive system of sensors is generally necessary to ensure the safety of the persons using the door. This system can consist of switch mats, sensor strips, light-beam curtains, infrared and radar sensors and photoelectric barriers. All these sensors, in themselves, make possible the safe operation of such a revolving door. But because such safety sensor systems are increasingly integrated into the revolving door itself, it can happen that the normal operation of the door can be interfered with by the functioning or even malfunctioning of all these different safety systems. That is, there are a good many emergency shutdowns of the revolving door, which generally require manual intervention by a person trained in maintenance and repair of the door.

A known revolving door of the type described above is disclosed in European Patent 0 340 771 A1. The individual door panels are fastened in a central area and are driven by a drive motor.

German Patent 39 34 662 A1 describes a revolving door which is provided with a safety circuit and an electric inertial mass which can be electrically decelerated or stopped. A programmable open-loop control system equipped with a microprocessor controls the operation of the door and also makes it possible for the safety sensors and devices to guarantee a smooth operation of the door.

In addition to the revolving doors described above, also known are doors which are not equipped with a drive motor. These manually operated revolving doors are generally of limited diameter, since the person using the door must manually set the panels of the revolving door in motion by pushing them. But such an effort is difficult or even impossible for older persons or physically handicapped persons. On account of the absence of a drive systems, these manually operated revolving doors do not have any type of safety equipment, but they are also severely restricted in terms of size.

The operating method for the open-loop and closed-loop control and regulation of a motor-driven revolving door which is disclosed herein makes it possible to eliminate the safety sensors or safety devices for the user which are otherwise necessary for the operation of such a door. An additional basic requirement is that it must be possible for physically handicapped persons and for older people to operate this revolving door without having to exert a great deal of force.

This object can be accomplished if the door is driven by an open-loop/closed loop microprocessor control system and operates with the electric propulsion system only in a quasi-assistance mode or servo operation, whereby the person using the door must also contribute to the power assist. To set a revolving door of this type in motion, a manual force in the direction of movement must be applied by the person using the door on at least one of the panels of the revolving door. As a result of this manual force, the panels of the door are set in motion, and thus an acceleration is transmitted to the open-loop/closed loop microprocessor control system by the measurement results transmitted by the incremental sensor. The open-loop microprocessor control system thereby recognizes that the panels are experiencing a rotational motion, and then makes certain that the electric motor drive assists this rotational velocity. This assistance can be explained as follows: From the measured total velocity $v_m$ of the panel of the door, or from the accelerating power of the door panel, caused by the manual force (actuation force) exerted by the person using the door, the open-loop/closed loop microprocessor control system calculates an assistance velocity $v_u$, which is less than the total velocity $v_m$ by an amount $\Delta v$. The following formula results for the assistance velocity $v_u$ of the panels of the revolving door:

$$v_u = v_m - \Delta v$$

The total velocity $v_m$ of the panels of the revolving door is composed of the assistance velocity $v_u$ produced by the electric motor, and the difference $\Delta v$ from the manual force and thus the velocity of the panel $v_m$, whereby after the brief start-up phase of the door panel, only a significantly lower force needs to be applied by the user, which corresponds to the velocity $\Delta v$. It can thus be said that the manual force is proportional to the velocity $\Delta v$. When a large force is applied, the velocity of the door panel is high, and when a small force is applied, it is low. This relationship makes it clear that the total velocity of the door panels is a function of two components, the manual velocity and the assistance velocity provided by the electric motor. As a result of these requirements, it is possible to keep the door panel from running away from the person, because continuous contact with the door panel is necessary to keep the door panel in motion.

To create a control system in which the electric motor operates in an assistance mode, it is necessary for the total velocity of the door panel $v_m$ to be measured by the incremental sensor, and processed on the basis of a selected program in the open-loop/closed loop microprocessor control system.

It is apparent that $v_U$ will always be less than the total velocity $v_m$. The value of $\Delta v$ can thereby be set, so that it is possible to regulate or to control the revolving door as a function of the site where it is installed, so that the assistance mode is set to a level which is appropriate for the persons using the door. Such a measure may be necessary in particular on doors which have different diameters.

Thus, there has been disclosed an operating method for the operation of a revolving door, in which an electric motor provides an assistance mode which supplies assistance so that the manual force applied by a person to a panel of the revolving door is reduced by a $\Delta v$, and thus the person using the door need only apply a slight additional force.

In further recapitulation, there is disclosed herein apparatus for driving the rotation of a revolving door about a central axis of the revolving door in response to the entry of a user thereinto, the revolving door including the central axis, a plurality of door panels extending radially outward from the central axis, a drive motor for supplying a rotational torque to the revolving door, and a control circuit for controlling the torque supplied to the revolving door by the drive motor, said apparatus comprising: means for sensing the magnitude of at least one of: a force applied by the user to at least one of said plurality of door panels; and a rotational velocity imparted by the user to said revolving door; and means for operating said control circuit to cause said drive motor to supply a rotational torque to said revolving door that is substantially proportional to said sensed magnitude of said at least one of said user applied force and said user imparted velocity.

There is also disclosed herein apparatus for driving the rotation of a revolving door about a central axis of the revolving door in response to the entry of a user thereinto, the revolving door including the central axis, a plurality of door panels extending radially outward from the central axis, a drive motor for supplying a rotational torque to the revolving door, and a control circuit for controlling the torque supplied to the revolving door by the drive motor, said apparatus comprising: means for sensing the magnitude of a user supplied parameter; and means for operating said control circuit to cause said drive motor to supply a rotational torque to said revolving door that is substantially proportional to said sensed magnitude of said user supplied parameter.

Further examples of general components relating to revolving doors may be found in the following patent publications: Federal Republic of Germany 4 124 282 (Dorma GbmH); Federal Republic of Germany 3 934 662 (Gallenschutz Metallbau GmbH); Federal Republic of Germany 4 207 705 (Dorma GmbH); U.S. Pat. Nos. 4,581,849; 4,154,023; and 4,952,080.

Figure 16:
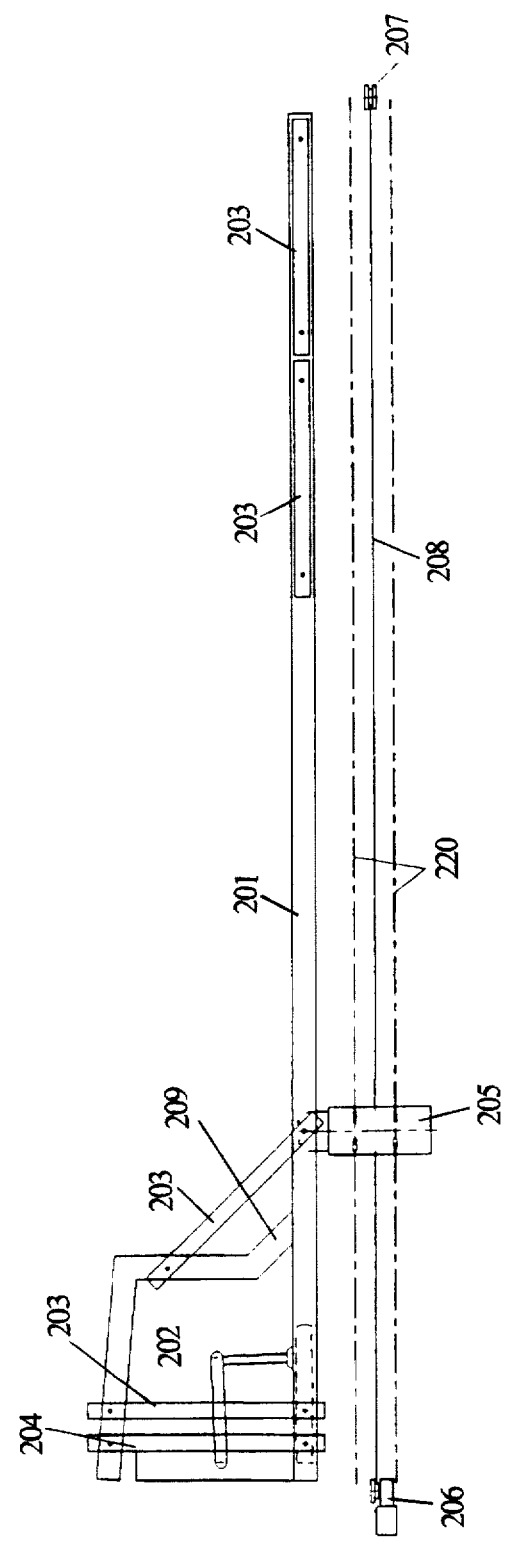
FIG. 16 shows an automatic partition system in a schematic overhead view.

FIG. 16 is a schematic illustration showing how, on a guide rail 201 which extends in a straight line, with a parked position 202 pivoted by 90 degrees in the left part of the figure, the elements 203 which are otherwise extended along the facade can be displaced. The guide rail 201 need not be in a straight form as in this embodiment. It is also possible for this guide rail 201 to be curved or bent. The curved elements 203 can be made of various types of materials, in particular glass, e.g. in front entrances, or can be made of a non-transparent material if the task at hand is to divide a large space into smaller segments inside a building. In the illustrated embodiment, a rotating panel 204 has been used, which is moved from the closed position into the open position by means of a corresponding drive device of a rotating panel drive 210 (see FIG. 19). This rotating panel 204 preferably is not guided in the guide rail 201, i.e. its movement is independent, and if desired, it can also be controlled by a sensor, if, for example, the rest of the facade, which consists of a plurality of individual elements 203, is to remain closed. To bring the individual elements 203 into the parked position 202 in which they are pivoted by 90 degrees, there should be a switch 209 on the guide rail 201. In front of the guide rail 201, additional slide or roller rails 220 can be placed which, like the guide rail 201, are positively and non-positively anchored in the vicinity of the ceiling. On the slide rails 220, a coupling device 205 is moved, which is driven by a drive belt 208 in connection with a pulley 207 by a drive motor 206.

By means of a control system (not shown in FIG. 16) which can be automatically programmed, or self-programmed, the coupling device 205 can be controlled so that it detects the individual elements 203 and moves them into the parked position 202. The individual elements 203 are each equipped with two trucks 224 (see FIG. 19), so that the individual elements 203 can move inside the guide rail 201. Support rollers 214 (also shown in FIG. 19) thereby support the weight of the element 203, and in the upper position of the truck 224 there are guide rollers 213 which can essentially guarantee a smooth travel in the guide rail 201. Connected with the truck 224 is a connecting shaft 211 which creates the connection with the element 203 suspended below the truck 224. This connecting shaft 211 is preferably made from a round bar. To guarantee a secure movement of the trucks 224 in the vicinity of the switch lever 209, those of the trucks 224 which are the first to approach the switch 209 are different, in terms of their dimensions, from the subsequent trucks. This measure is necessary because at this point, the first truck 224 is threaded or introduced in a forced manner inside the area of the switch 229. The subsequent truck 224 must thereby be prevented from entering the switch 209, which can be achieved, for example, by means of a guide rail 227 which is attached inside the guide rail 201.

Furthermore, on each second truck 224, with reference to the direction of travel into the switch 209, there is an indicator 222 which makes it possible to conduct an identification of the element 203 and thus its location. The indicator 222 can be a microswitch, a magnet which interacts with a reed contact, a proximity switch or any other sensor means capable of correctly defining individual elements 203 and thus their location. Next to the guide rail 201, as described above, there preferably are two slide rails 220 for the coupling device 205, which make it possible to have the coupling device 205 travel past the guide rail 201 at a defined distance in front of it. The coupling device 205 is driven by the drive belts 208. The coupling device 205 can be embodied by an electromagnet, whereby a slide 216 is connected with the armature 217 of the electromagnet 218. The slide 216 can thereby be realized so that it is made of a flat material, for example, in which there are slots 225 (see FIG. 20), so that the slide 216 can be displaced in the horizontal direction. On one end, the slide 216 has a fork-shaped recess 228 which can be brought into engagement with the connecting shaft 211 by actuating the electromagnets 218.

Attached to the coupling device 205 is an identification system 221 which interacts with the indicators 222 which are located on the individual elements 203. When, for example, the identification system 221 encounters an element 203 with its indicator 222, and the respective element is to be displaced, the coupling device 205 remains in this position, and by means of a program command extends the slide 216, which creates a connection with the element 203 by means of an engagement of the fork-shaped recess 228 with the connecting shaft 211. The electromagnet 218 thereby remains turned on until the controller sends the message that the coupling device 205 has moved the element 203 into the parked position 202. When the electromagnet 218 is de-energized, a compression spring 229 essentially guarantees that the slide 216 is disengaged from the connecting shaft 211.

The entire device for the automatic movement of the elements 203 described above can also be fastened in the vicinity of the ceiling by means of the fastening devices 212. As a result of this measure it is possible to install the entire unit on existing systems, and in effect to retrofit these systems which were formerly operated manually, thereby making automatic operation possible.

The coupling device 205 and the identification system 221 are preferably fed the corresponding control data and power by means of a trailing cable 219. Here again, however, a system of rails with corresponding sliding-action contacts, or wipers, can also be used. As a result of the action of the control system used, which can be a stored program controller, for example, the coupling device 205 first performs a learning cycle, to learn:

a) how long the system is; and b) how many elements 203 are in such a system.

When the system is operated automatically, each individual panel can be moved into the parked position 202. Each individual panel can also be moved automatically out of the parked position 202 if the entire system is to be moved into the closed position. With this invention, it is also possible to open the elements 203 part way. A partial opening can be accomplished on one hand by means of the rotary panel drive 210 in connection with the actuator arm 226, and also by means of the controller. In the latter case, one or more elements 203, as desired, can be moved laterally, and the other elements 203 can remain in their closed position.

Figure 17:
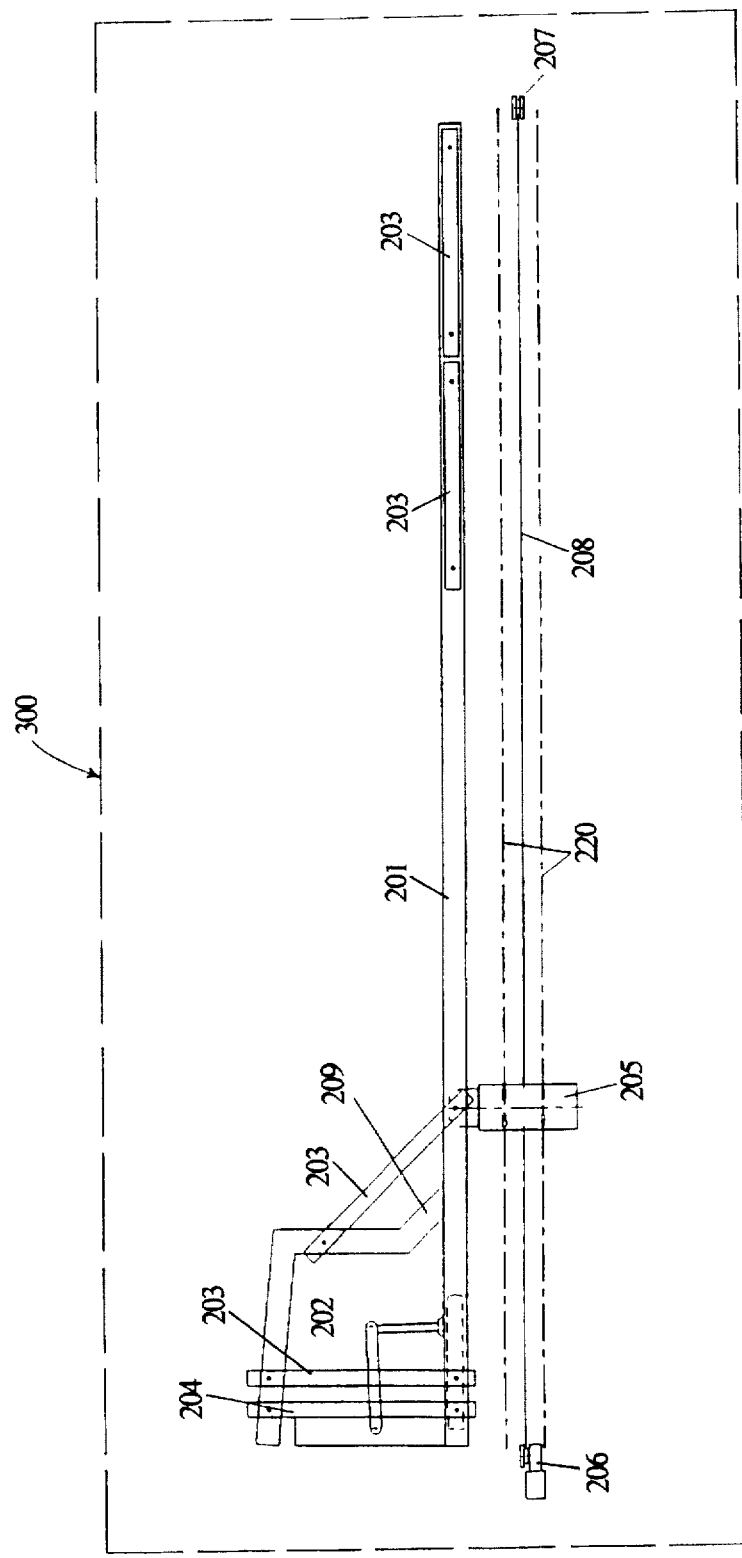
FIG. 17 shows the same view as FIG. 16, but shows additional components.
Figure 18:
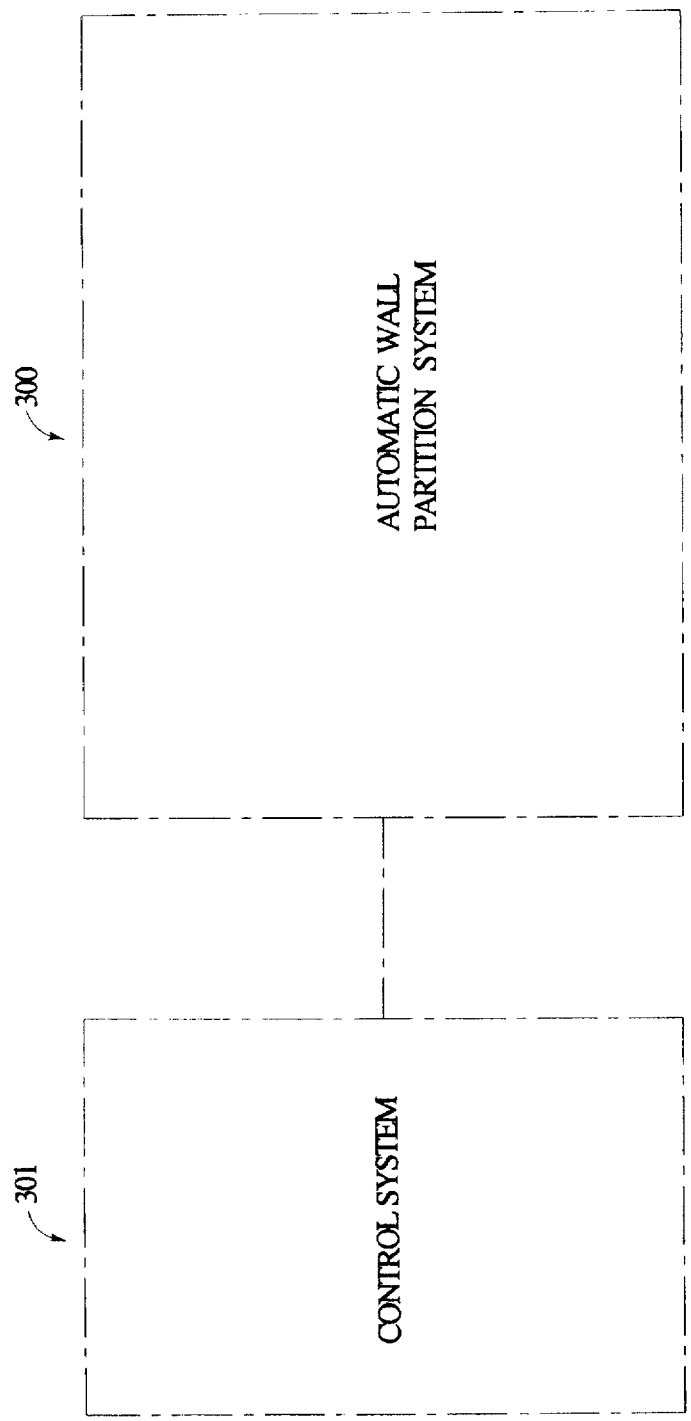
FIG. 18 illustrates the relationship between a control system and an automatic partition system.
Figure 19:
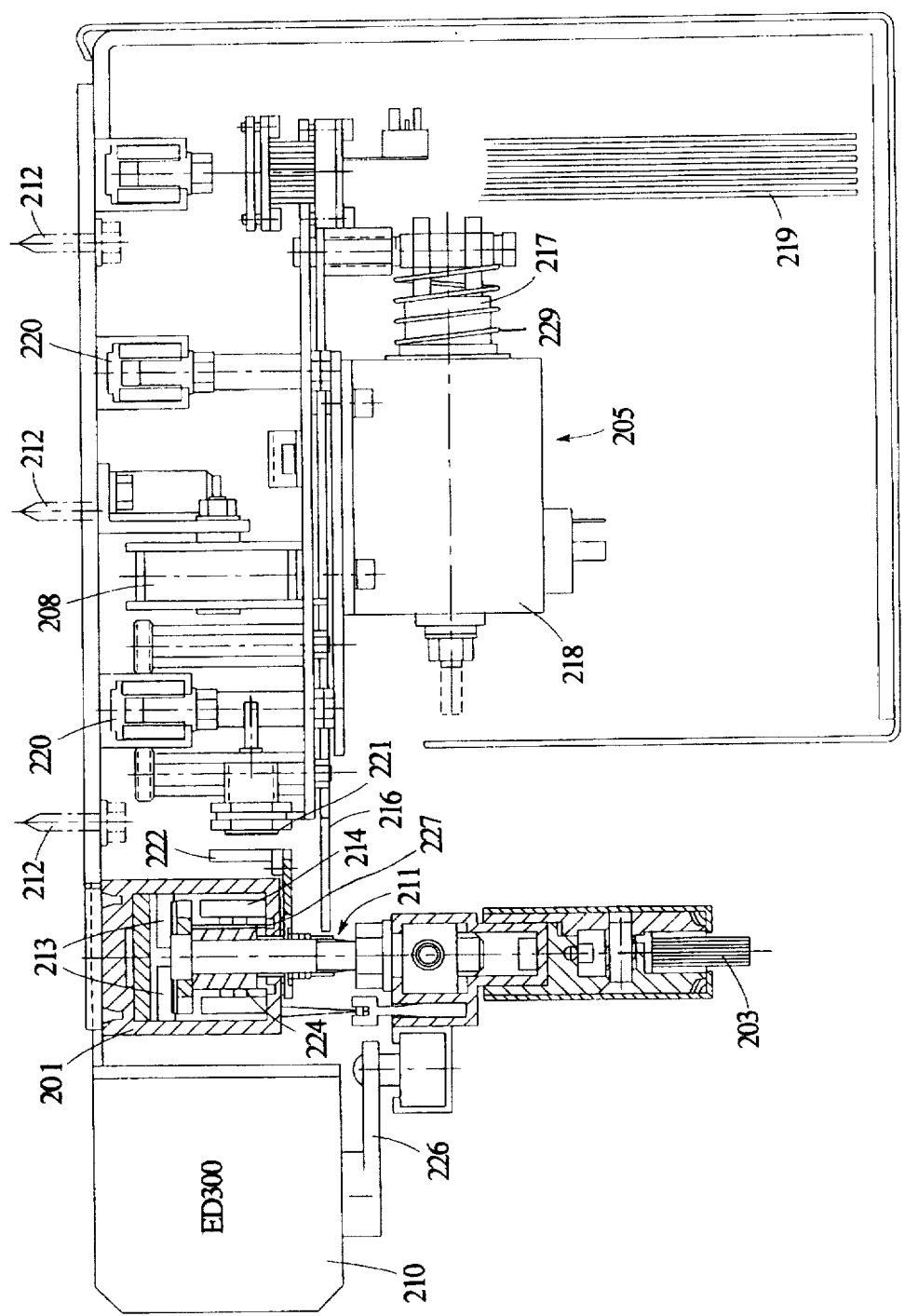
FIG. 19 shows a sectional view, from the side, of a coupling device with corresponding slide or roller rails and wall elements.
Figure 20:
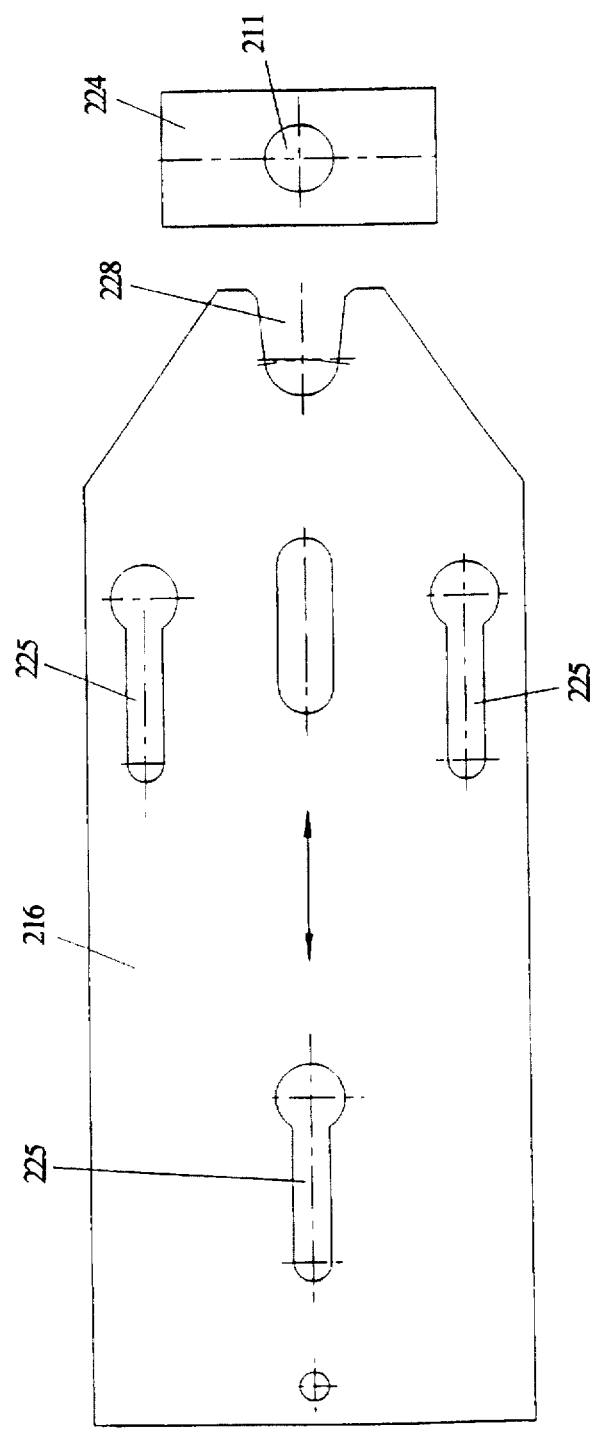
FIG. 20 shows a slide of the coupling device in an overhead view.
Figure 21:
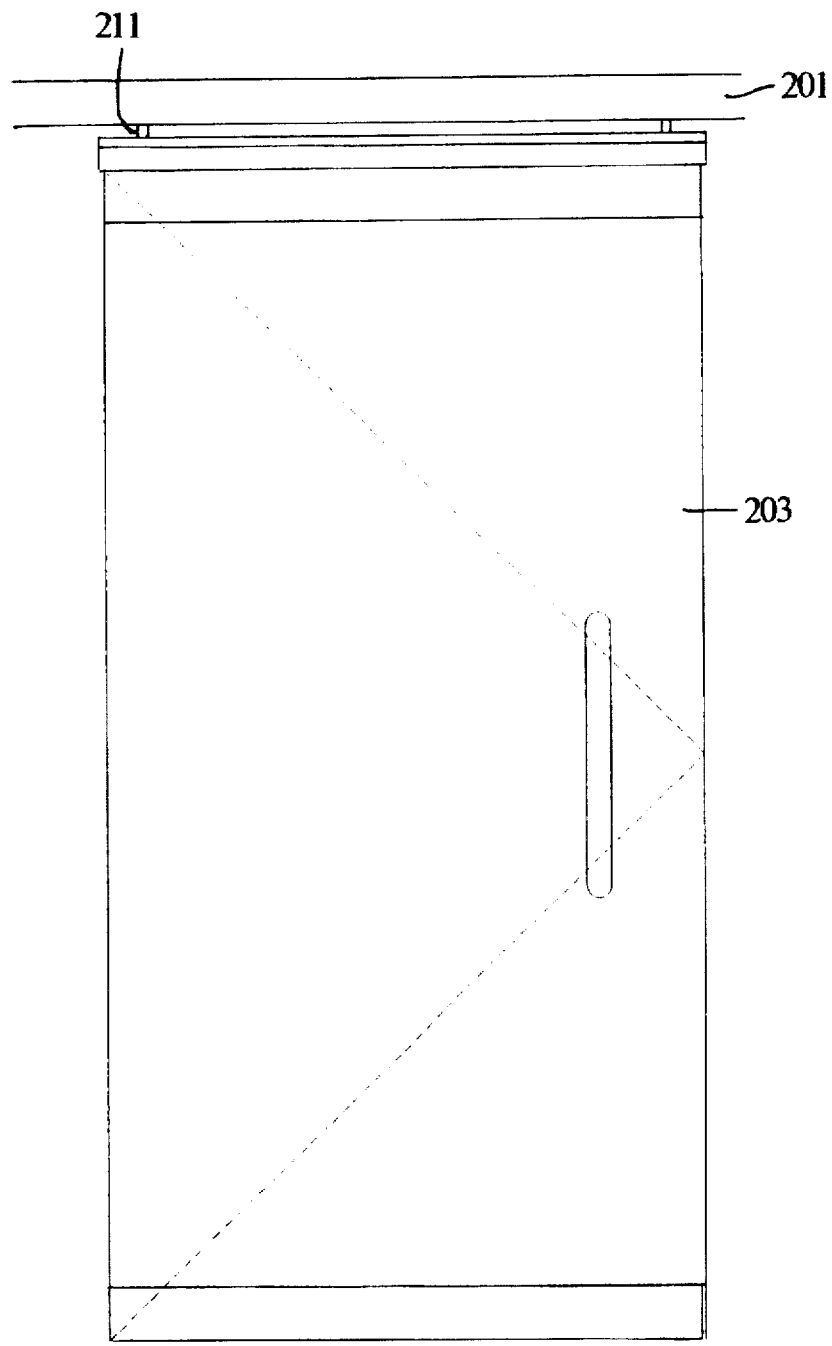
FIG. 21 shows one possible embodiment of a movable wall element.

FIGS. 17 and 18 are schematic representations of one embodiment. FIG. 18 illustrates the automatic wall partition system 300 and the control device 301 as being operatively connected to one another. FIG. 21 shows one possible embodiment of a wall element 203.

Figure 22:
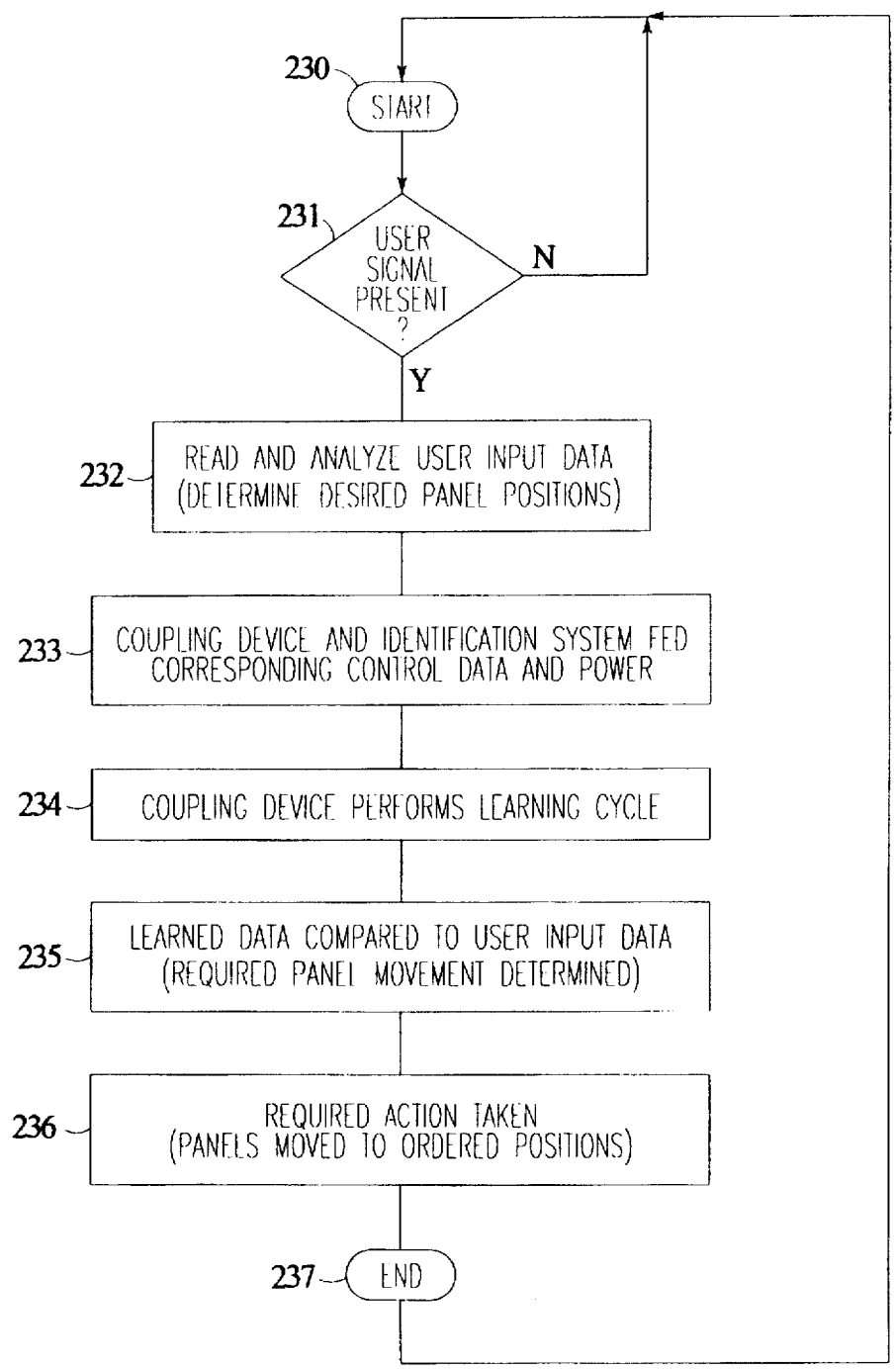
FIG. 22 is a flow chart illustrating an example of logic that may be employed by a control system.
Figure 23:
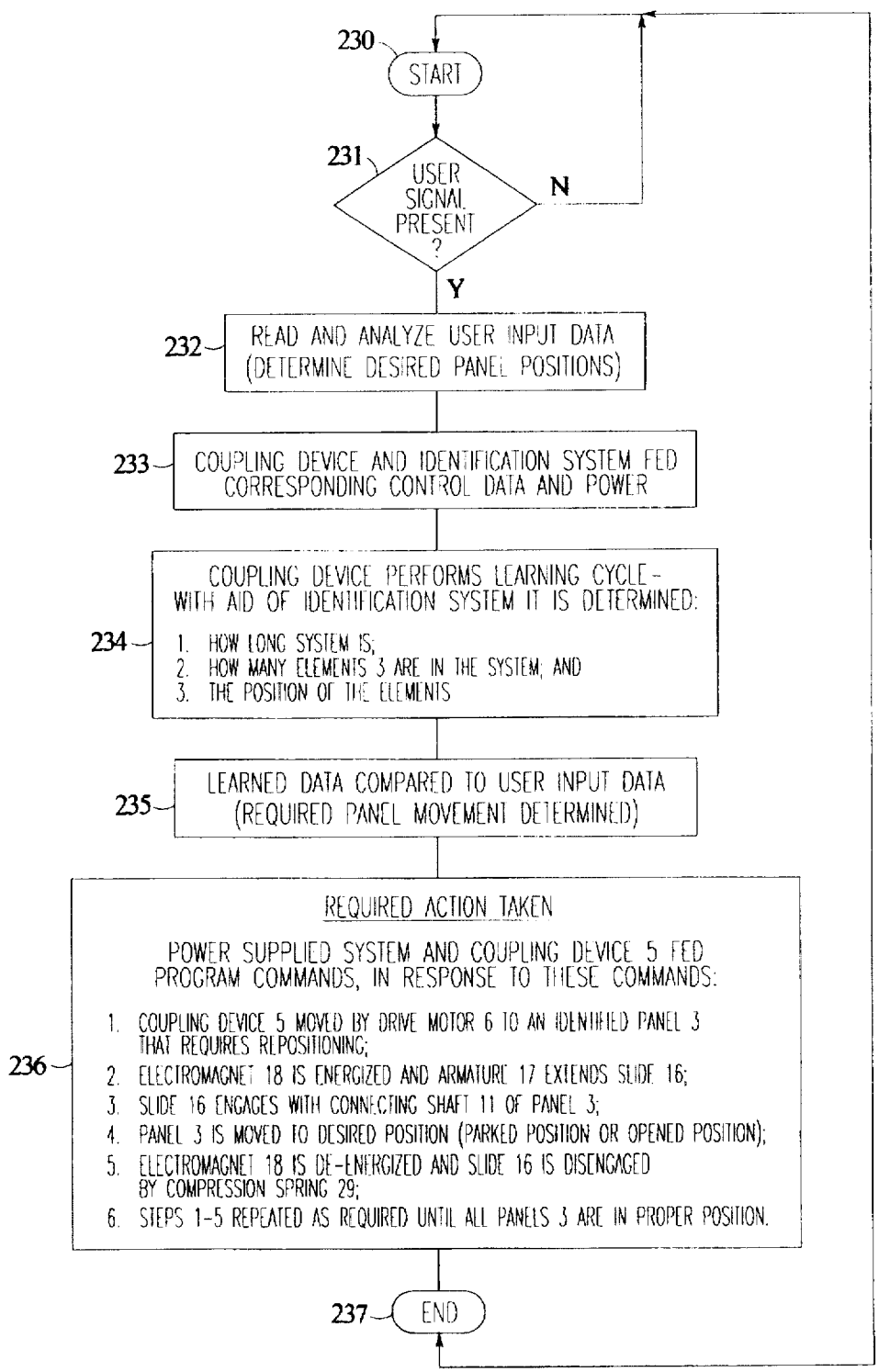
FIG. 23 is same flow chart as FIG. 22 with additional details.

FIGS. 22 and 23 are flow charts illustrating the logic that may be employed by an automatically programmed control system 301 in accordance with at least one embodiment of the instant invention. Upon start up (at 230) of the control system 301 (shown in FIG. 18), the control system 301 determines whether a User Signal is present (at 231), that is, for example, whether User Input Data has been entered. User Input data can include, for example, codes or directions indicating the user's desired positioning of the elements 203. If User Input Data has been entered, the control system analyzes this data (at 232) and then sends the necessary control data and power to the coupling device 205 and identification system 221 (at 233) which is attached to the coupling device 205. The coupling device 205 then performs the above described learning cycle (at 234), including the location of the identified panels. This can be accomplished by use of the identification system 221 which interacts with the indicators 222 which are located on the individual panels 203. The control system 301 can then compare the "learned data" with the User Input Data, and determine what action is required by the system (at 235). The required action is then taken (at 236), that is, the coupling device 205 is fed the program commands necessary for it to move the appropriate panels into the user desired positions. This is preferably accomplished by means of the program controlled electromagnet 218 which, when energized, extends slide 216 so as to engage it with a panel 203. Once engaged with the coupling device 205, the coupling device 205 can then move the panel 203 to the desired location. Once the panel 203 is properly located, the electromagnet 218 is de-energized in response to a command from the control system 301, and thereby releases the panel 203.

To further explain, as described above, by means of a control system 301 which can be automatically programmed, or self-programmed, the coupling device 205 can be controlled so that it detects the individual elements 203 and moves them into the parked position 202. The individual elements 203 are each equipped with two trucks 224, so that they can move inside the guide rail 201. Support rollers 214 thereby support the weight of the element 203, and in the upper position of the truck 224 there are guide rollers 213 which essentially guarantee a smooth travel in the guide rail 201. Connected with the truck 224 is a connecting shaft 211 which creates the connection with the element 203 suspended below the truck 224. This connecting shaft 211 is preferably made from a round bar. To essentially guarantee a secure movement of the trucks 224 in the vicinity of the switch lever 209, those of the trucks 224 which are the first to approach the switch 209 are different, in terms of their dimensions, from the subsequent trucks. This measure is necessary because at this point, the first truck 224 is threaded or introduced in a forced manner inside the area of the switch 209. The subsequent truck must thereby be prevented from entering the switch, which can be achieved, for example, by means of a guide rail 227 which is attached inside the guide rail 201.

Furthermore, on each second truck, with reference to the direction of travel into the switch 209, there is an indicator 222 which makes it possible to conduct an identification of the element 203 and thus its location. The indicator 222 can be a microswitch, a magnet which interacts with a reed contact, a proximity switch or any other sensor means capable of correctly defining individual elements and thus their location. Next to the guide rail 201, as described above, there preferably are two slide rails 220 for the coupling device 205, which make it possible to have the coupling device 205 travel past the guide rail 201 at a defined distance in front of it. The coupling device 205 is driven by the drive belts 208. The coupling device 205 consists essentially of an electromagnet, whereby a slide 216 is connected with the armature 217 of the electromagnet. The slide 216 can thereby be realized so that it is made of a flat material, for example, in which there are slots 225, so that the slide can be displaced in the horizontal direction. On one end, the slide 216 has a fork-shaped recess 228 which can be brought into engagement with the connecting shaft 211 by actuating the electromagnets 218.

Attached to the coupling device 205 is an identification system 221 which interacts with the indicators 222 which are located on the individual elements 203. When, for example, the identification system 221 encounters an element 203 with its indicator 222, and the respective element is to be displaced, the coupling device 205 remains in this position, and by means of a program command extends the slide 216, which creates a connection with the element 203 by means of an engagement of the fork-shaped recess 228 with the connecting shaft 211. The electromagnet 218 thereby remains turned on until the controller sends the message that the coupling device has moved the element 203 into the parked position 202. When the electromagnet 218 is de-energized, a compression spring 229 guarantees that the slide 216 is disengaged from the connecting shaft 211.

Examples of devices and methods for the operation and movement of wall and door panels may be found in the following documents: U.S. Pat. Nos. 5,295,281; 5,311,642; 5,369,912; 5,394,648; 5,417,013; U.S. patent application Ser. No. 08/147769; filed on Nov. 2, 1993 entitled "Movable Wall System", having inventors Herbert KORDES, which is based on Federal Republic of Germany patent application No. P 41 33 578 filed on Oct. 10, 1991, which corresponds to DE-OS 41 33 578 and DE-PS 41 33 578, and claiming Continuation-In-Part Status from International Application No. PCT/DE92/00951, filed Nov. 11, 1,992; U.S. patent application Ser. No. 08/369797 filed on Jan. 6, 1995 entitled "Wall Assemblies having Glass Doors or Glass Panes or Glass Wall Sections & Connection Members for Connection of Plate Shaped Wall Elements Such as Glass Doors, Glass Panes & Glass Wall Sections; Connection Member for Connection of Plate Shaped Wall Elements", having inventor Peter EUTEBACH, which corresponds to Federal Republic of Germany patent application No. P 43 15 357, filed on May 8, 1993, which corresponds to DE-OS 43 15 357 and DE-PS 43 15 357 and International Application No. PCT/DE94/00340, filed Mar. 24, 1994 which corresponds to WO 94/27019; U.S. patent application Ser. No. 08/369784 filed on Jan. 6, 1995 entitled "Door, Such as a Glass Door, Which Door has a Fitting With a Plate; Door Fitting With Plate", having inventor Peter EUTEBACH, which corresponds to Federal Republic of Germany patent application No. P 43 15 361 filed on May 8, 1993, which corresponds to DE-OS 43 15 361 and DE-PS 43 15 361, and International Application No. PCT/DE94/00173 filed Feb. 12, 1994 which corresponds to WO 94/27009; U.S. patent application Ser. No. 08/538160 entitled "Operating Method for the Operation of a Revolving Door" filed Oct. 2, 1995, having inventor Jurgen STARK, which corresponds to Federal Republic of Germany patent application No. P 44 02 899 filed Feb. 2, 1994, which corresponds to DE-OS 44 02 899 and DE-PS 44 02 899, and International Application No. PCT/DE94/01459 filed Dec. 8, 1994; U.S. Patent application Ser. No. 08/527823 filed on Jul. 28, 1995, now U.S. Pat. No. 5,625,266, entitled "Sliding Door with a Drive Motor System & Control & Regulation for a Door Driven by an Electromechanical Motor", having inventor Jurgen STARK, which corresponds to Federal Republic of Germany patent application No. P 43 40 715 filed Nov. 30, 1993, which corresponds to DE-OS 43 40 715 and DE-PS 43 40 715, and International Application No. PCT/DE94/01316 filed Nov. 2, 1994 which corresponds to WO 95/5517; U.S. patent application Ser. No. 08/582848 filed on Dec. 29, 1995 entitled "Method for the Closed-Loop Control of an Automatic Door Which is Propelled by a Drive Motor", having inventors Ulrich THEILE, which corresponds to Federal Republic of Germany patent application No. P 44 15 164, filed on May 2, 1994, which corresponds to DE-OS 44 15 164 and DE-PS 44 15 164, and International Application No. PCT/DE95/00169, filed Feb. 10, 1995 which corresponds to WO 95/30265; U.S. patent application Ser. No. 08/538156 filed on Oct. 2, 1995 entitled "Operating Method for the Operation of a Revolving Door", having inventors Jurgen STARK and Steffen STRUNK, which corresponds to Federal Republic of Germany patent application No. P 44 03 565, filed on Feb. 7, 1994, which corresponds to DE-OS 44 03 565 and DE-PS 44 03 565 and International Application No. PCT/DE94/01543, filed Dec. 24, 1994; U.S. patent application Ser. No. 08/597131 filed on Feb. 6, 1996 entitled "Door Closer for a Two-Panel Door with a Closing Sequence Control Mechanism", having inventor Horst TILLMANN, which corresponds to Federal Republic of Germany patent application No. 295 01 776, filed on Feb. 7, 1995, which corresponds to DE-OS 295 01 776 and DE-PS 295 01 776. These patents and patent applications and their corresponding published patent applications, as well as their published equivalents, and other equivalents or corresponding applications, if any, and the publications recited in any of the documents, publications, patents, and published patent applications appearing or recited herein, are hereby incorporated by reference as if set forth in their entirety herein. All of the above U.S. patent documents in this paragraph are assigned to Dorma GmbH+Co. KG of the Federal Republic of Germany.

Some examples of control systems which measure operating parameters and learn therefrom are disclosed in U.S. Pat. Nos. 5,191,272; 5,223,820; and 4,655,188, which U.S. patents are hereby expressly incorporated by reference herein.

Some examples of computer systems and methods and their components which may be incorporated are to be found in U.S. Pat. Nos. 5,379,428; 5,398,333; 5,390,301; 5,404, 544; 5,418,942; 5,479,355; and 5,428,790.

Some examples of rail switches or levers, or components thereof, which may be incorporated are to be found in U.S. Pat. Nos. 5,392,895; 5,404,992; 5,438,911; 5,440,289; and 5,462,245.

Some examples of sensor and switches which may be incorporated are to be found in U.S. Pat. Nos. 5,379,023; 5,453,589; 5,453,590; 5,378,865; 5,408,132; 5,428,253; 5,442,150; 5,430,421; and 5,444,295.

Some examples of electromagnets and their components which may be incorporated are to be found in U.S. Pat. Nos. 5,389,905; 5,392,015; 5,402,093; and 5,410,289.

Some examples of open-loop control circuits which may be incorporated are to be found in U.S. Pat. Nos. 5,210,473; 5,320,186; and 5,369,342, which U.S. patents are hereby incorporated by reference herein.

Some examples of closed-loop control circuits which may be incorporated are to be found in U.S. Pat. Nos. 5,189,605; 5,223,072; and 5,252,901, which U.S. patents are hereby incorporated by reference herein.

Some examples of look up tables accessed by computers or microprocessors which may be incorporated in an embodiment are to be found in U.S. Pat. Nos. 5,284,116; 5,359,325; and 5,371,537, which U.S. patents are hereby incorporated by reference herein.

Figure 24:
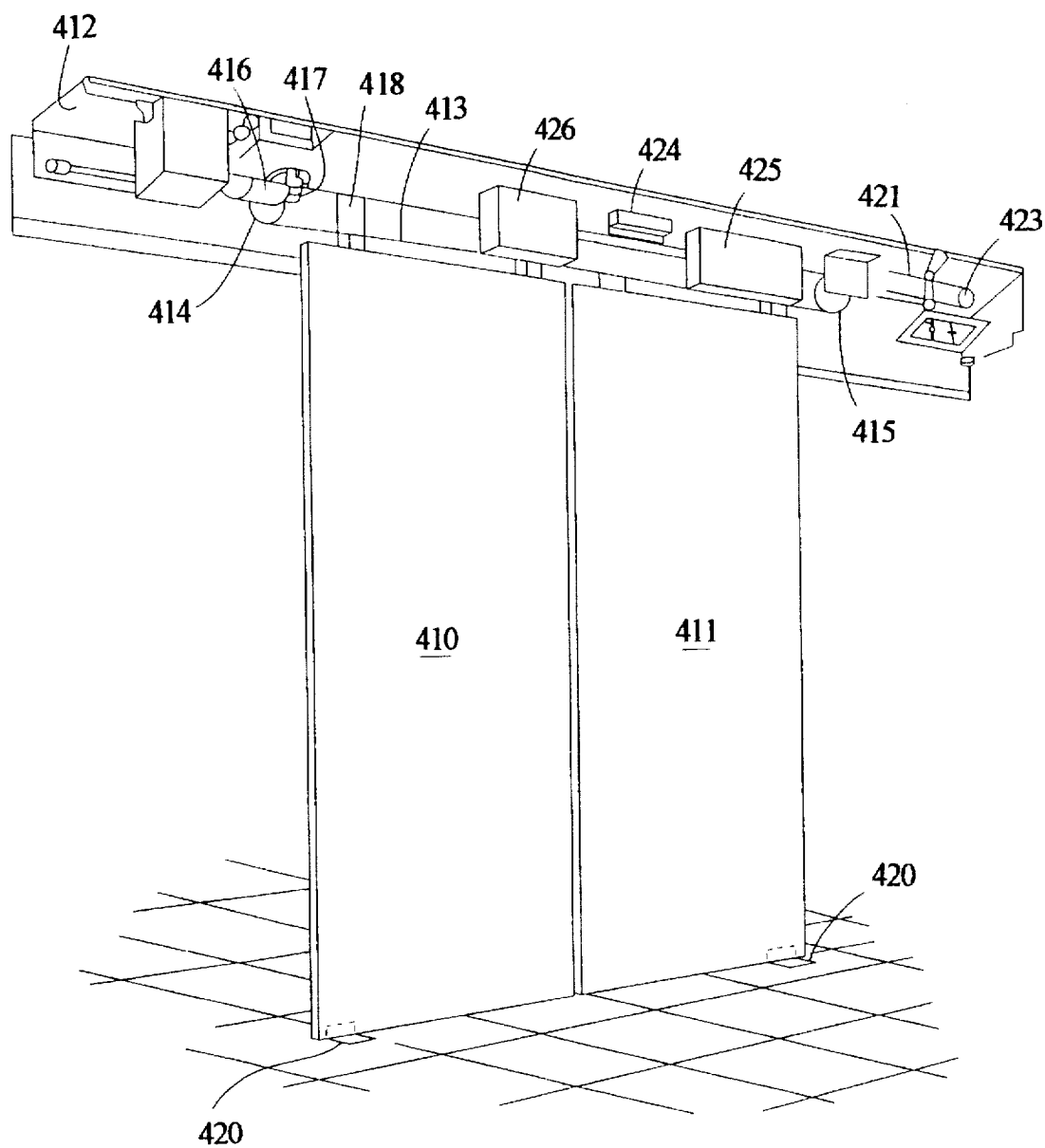
FIG. 24 is a perspective view of a door with door controls and a door-safety module.

FIGS. 24=26 illustrate a conventional sliding door, and associated mechanisms.

Figure 25:
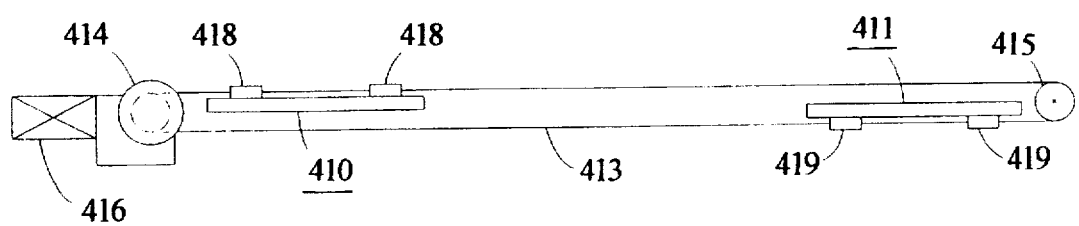
FIG. 25 is a schematic representation of a motorized mechanism that can drive a door panel.

As shown in FIGS. 24 and 25, panels 410 and 411 of a two-paneled sliding door can, in a known manner, be mounted on rollers on a track that is part of a springer 412. The carrier, in which the rollers are mounted, can also have backing rollers to prevent the panels from coming loose.

The illustrated embodiment of panels 410 and 411 can typically be activated by a drive mechanism 413, which can, for example, be a continuous toothed belt with one end travelling around a cogwheel 414 and the other around a pulley 415 secured to springer 412. Cogwheel 414 can typically be connected to a motor 416 with a transmission by way of an electromagnetic clutch 417 in such a way as to transmit torque. Panel 410 can be secured to one strand of belt drive 413 in a known manner, for example by brackets 418, and panel 411 can be secured to the other strand by brackets 419, ensuring that the panels (410, 411) will slide in opposite directions when the belt drive 413 is activated. Panels 410 and 411 can be secured to the floor in a known manner, with known floor slides 420.

In addition to the main drive mechanism just described, illustrated in FIG. 25 and comprising a continuous belt drive 413, the door panels can also be operated with an auxiliary drive mechanism. This mechanism can typically consist essentially of a resilient structure 421 with one end engaging one of the panels (411, for example) and the other end secured to a stationary point 422 on springer 412. When the panel is shifted into its closed position by motor 416, resilient structure 421, which travels around pulleys 423, is tensioned and accumulates potential energy when panels 410 and 411 are together. When, accordingly, the door is closed and electromagnetic clutch 417 is deprived of current, the tension in resilient structure 421 will force panels 410 and 411 into the open position illustrated in FIGS. 25 and 26. Since both panels are connected by belt drive 413, panel 410 will essentially move along with the panel 411 that is directly subjected to resilient structure 421. The two panels (410, 411) can be secured together, when closed, by a known type of locking mechanism 424.

The motion of panels 410 and 411 can typically be regulated with regular controls 425 electrically connected to a door-safety module 426 that constitutes additional electronic controls. Door-safety module 426 can be positioned between a motion sensor (not shown) (which can, for example, be a radar, infrared, ultrasonic or visible-light barrier), a programming switch (not shown) and a limit switch (not shown) on the one hand and the regular controls 425, the electromagnetic clutch 417 and signaling devices (not shown) on the other.

Figure 26:
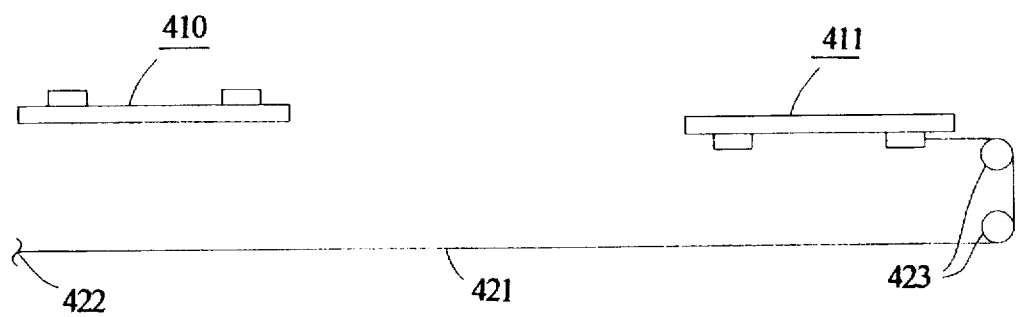
FIG. 26 is a schematic representation of an auxiliary drive mechanism associated with a door panel operated by that mechanism and connected to another door panel by a motorized drive stage illustrated in FIG. 25.

Other details relating to the conventional door arrangement, and controls associated therewith, described hereabove and illustrated in FIGS. 24–26, may be found in U.S. Pat. No. 5,127,190 to Hein et al., entitled "Sliding Door".

The disclosure now turns to a description of a control and regulation arrangement. It will be understood that components discussed herebelow with reference to FIGS. 27–30 may, if appropriate, be considered to be interchangeable with similar components discussed hereinabove with relation to FIGS. 24–26.

Figure 27:
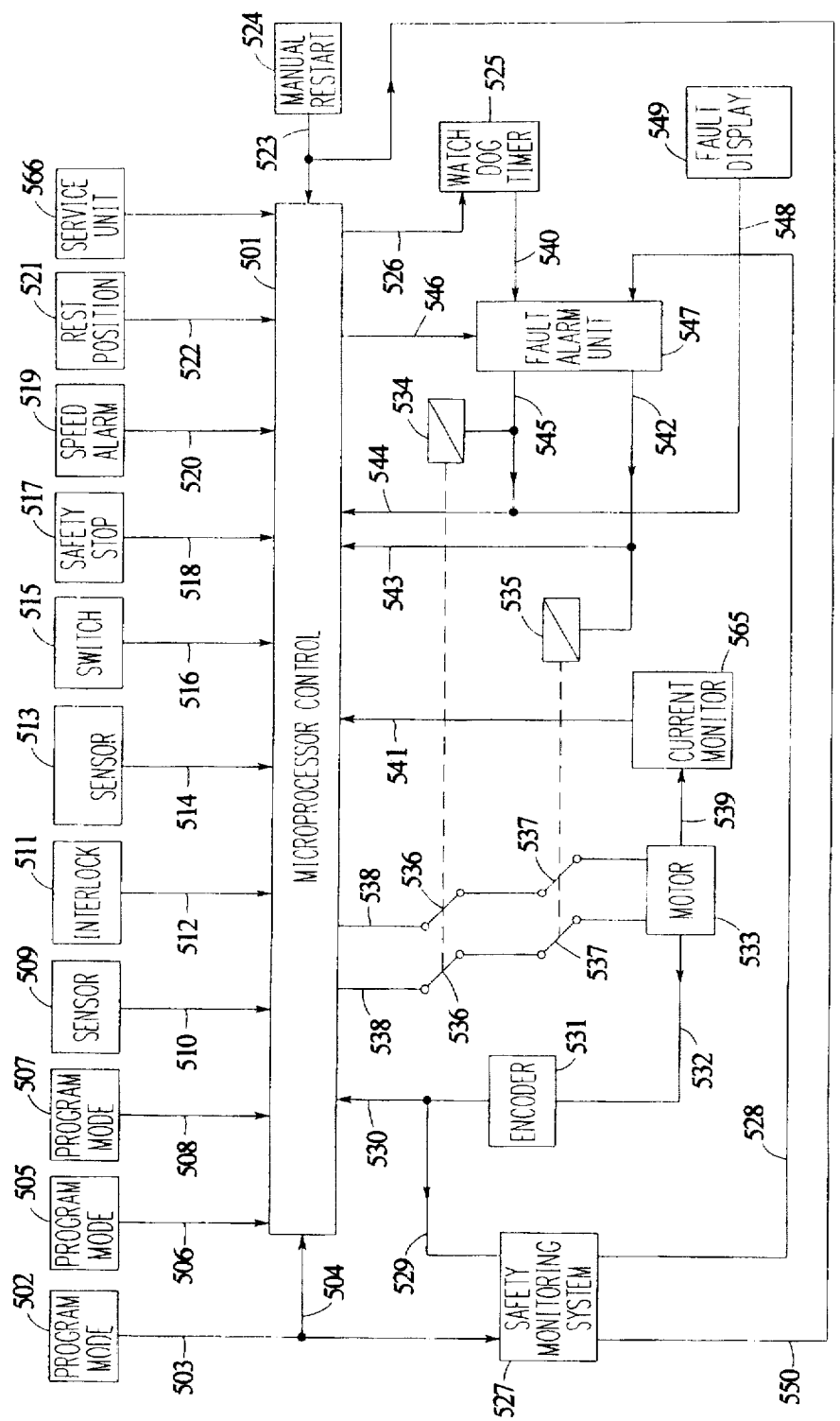
FIG. 27 is a schematic diagram of the circuitry of a control and regulation system equipped with redundant safety measures.

FIG. 27 shows the basic coupling of the microprocessor control system 501 to safety-related branches, to the safety monitoring system 527 and its fault alarm unit 547, in connection with the watch dog timer 525. In general, it should be stated that this control and regulation concept is essentially independent of the type of door to be connected, and thus can be used on essentially all control and/or regulation systems of automatic doors.

The information from the various program modes 502, 505, 507 is preferably transmitted to the microprocessor control system 501 by means of connections 503, 504, 506 and 508. The status of the other safety-related equipment connected, such as the sensor 509, interlock 511, an additional sensor 513, the switch 515, and the safety stop 517 can also be reported to the microprocessor control system 501 by means of the connections 510, 512, 514, 516 and 518. For example, a particularly sensitive area of the program mode 502, in addition to the processing in the microprocessor control system 501, can also be forwarded to the safety monitoring system 527 by means of the connection 503. In this embodiment, the safety monitoring system 527 represents the double redundancy or double-channel arrangement, since, independently of the microprocessor control, the safety monitoring system 527, in connection with the fault alarm unit 547, is able to bring the connected motor to a stop.

Since the safety monitoring system 527 preferably has direct access to a potential blocking of the motor 533, the signal emitted by the motor via the connection 532 to the encoder 531 should also preferably be brought to the safety monitoring system 527 via the connection 529. Simultaneously, the encoder 531 is preferably connected to the microprocessor control system 501 via the connection 530. It is apparent that the signal regarding the direction of rotation and the speed of the motor is preferably transmitted both to the microprocessor control system 501 and to the safety monitoring system 527.

For example, if, as a result of a technical defect, the shutdown branch of the microprocessor control system is not operable, the fault alarm unit 547 is preferably addressed by the safety monitoring system 527 via the connection 528. This fault alarm unit 547 can also be made to respond, e.g. by the connector 542 of the relay 535, or depending on the circuit, even to fail, so that the contacts 537 interrupt the actuation 538 of the motor 533. Depending on the direct current motor 533 used, for example, the motor can operate on a braking resistance and/or can be directly short-circuited. Consequently, the connected door essentially comes to a stop immediately. In addition to the actuation of the relay 535, this signal is also preferably simultaneously forwarded to the microprocessor control 501 by the actuator 542 via the connection 543.

To safely guarantee the correct operation of the microprocessor control system 501, the system preferably sends a trigger signal 526 to a watch dog timer 525. This watch dog timer, for its part, preferably sends a reset signal 540 to the fault alarm unit 547. This also shows that the microprocessor control system 501 is designed with an increased level of safety in mind, because if the microprocessor control system 501 were not capable of bringing the motor 533 to a stop, e.g. in the event of a failure or malfunction, in this case the watch dog timer 525 would send a corresponding alarm to the fault alarm unit 547, and the fault alarm unit 547 would bring the motor 533 to a stop. If the motor 533 is brought to a stop by shutting off the bypass path, i.e. by means of the safety monitoring system 527, basically there has been a fault in the control system. That justifies a situation in which the door cannot be restarted automatically, but in which the entire system must be deliberately restarted by means of a manual reset-start 524. This reset-start 524 is preferably transmitted on one hand via the connection 523 to the microprocessor control system 501, and on the other hand via the connection 550 directly to the safety monitoring system 527, and here again, the double redundancy should preferably be achieved independently of the microprocessor control system 501.

However, in accordance with at least one preferred embodiment, the fault alarm unit 547 should also preferably be tested by the microprocessor control system 501 via the connection 546. In this case, the relay 534 is preferably activated by means of the actuator 545. The return message that the relay 534 has been actuated is preferably sent to the microprocessor control system 501 via the connection 544. The relay 534, with its contacts 536, preferably interrupts the actuator 538 of the motor 533. Simultaneously with the actuation of the relay 534, the fault display 549 is preferably actuated via connection 548. In the fault display unit, either an acoustical signal and/or an optical display can be used to inform the maintenance or service personnel directly of which fault has occurred in the system.

In accordance with at least one preferred embodiment, an additional safety device is provided in that there is a motor current monitoring system 565, by way of the connection 539 from the motor 533. The motor current monitoring system 565 preferably continuously sends its signals to the microprocessor control system 501 by means of the connection 541.

In addition to the various possible connections indicated above, the type of speed selected by means of the speed alarm 519 is available to the microprocessor control system 501 via the connection 520, and likewise, if the door in question is a revolving door, the rest position (X-position) 521 is preferably reported to the microprocessor control system 501 by means of the connection 522.

In addition to the automatic operation as described above, it is also possible to connect a service unit 566 to the microprocessor control system 501. The service unit 566 makes it possible, by means of additional manual switches, to test the double-redundant safety monitoring function of the entire system. However, for this purpose, it is desirable to have a program in the microprocessor control system 501 which prevents the braking of the door when it receives a stop signal from the sensors. For example, it is possible, that by means of the various switches, e.g. test stop 567, automatic 568, servo 569 and position 570 (see FIG. 30), various procedures, and thus also simultaneously safety functions, can be tested, to determine whether they are still within the tolerances specified by the manufacturer. As a result of this measure, it is possible to identify drifting of all sorts of values early on, and to make it possible for service personnel to take corresponding measures in the form of preventive maintenance in the control system, so that following test operation, the door will not fail or malfunction in normal operation.

Figure 30:
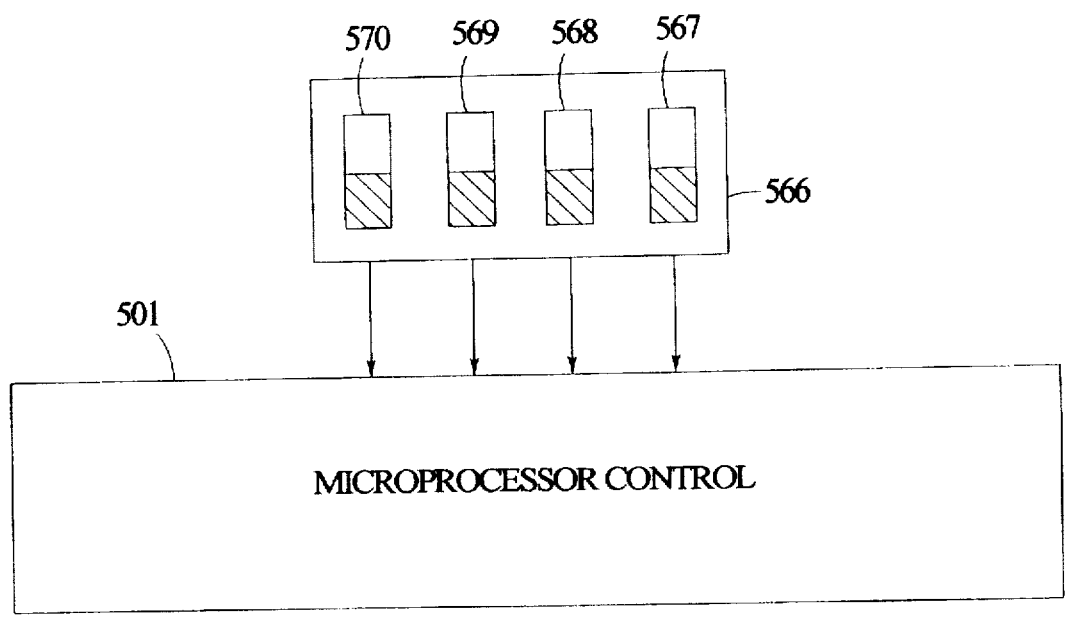
FIG. 30 is a service unit with microprocessor control.

Thus, in other words, in accordance with a preferred embodiment, a service unit 566, which may alternatively be termed a "test unit" or "monitoring unit", may be provided to test the system, essentially by means of manual switches. The microprocessor 501 can be suitably programmed so as to prevent actual braking of the door in question when, for example, a "stop" signal is provided to the microprocessor 501 during testing. Service unit 566 is illustrated more particularly in FIG. 30, although the illustration in FIG. 30 is intended to be a non-restrictive example. Conceivably, then, in accordance with at least one preferred embodiment of the present invention, service unit 566 may include any types of switches that will permit service personnel to send appropriate signals to the microprocessor 501 so as to optimally test and monitor any desired functions of the door. The specific types of manual switches, circuitry and programming that would be suitable for these purposes would appear to be well within the purview of one of ordinary skill in the art, and will thus not be described in further detail herein.

Figure 28:
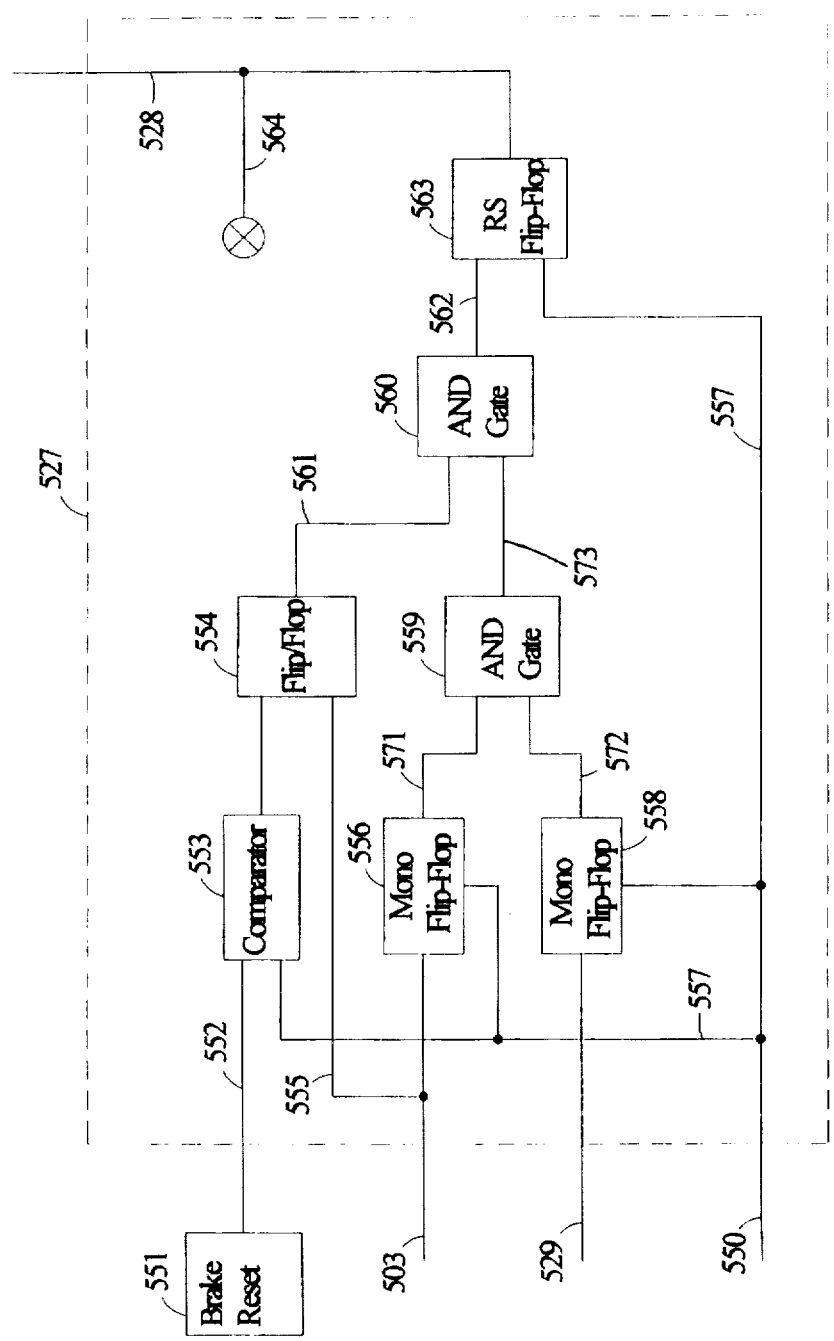
FIG. 28 illustrates a safety monitoring system.

FIG. 28 illustrates how the safety monitoring system 527 works in accordance with at least one preferred embodiment. Starting from the microprocessor control system 501, after the door has been braked, a standard brake reset signal 551 can be sent in the normal manner via the connection 552 to the comparator 553. This comparator 553, in the event of a signal of "greater than or equal to 1", can set the RS flip-flop 554 by means of the reset input. The flip-flop 554 is thus activated, and when a stop signal is applied via the line 503, the flip-flop can be placed in connection with the connection 555 by means of its S-input. The RS flip-flop 554 can give a preparatory signal by means of the connection 561 to the AND gate 560. Thus, for example, an emergency stop is stored in memory. However, this stop signal can also be and simultaneously sent by means of the connection 503 to a mono-flop 556. The mono-flop 556 is thereby triggered, and generates a low signal for a specified length of time, preferably as a function of the stopping distance of the door. This time is the waiting time, during which the microprocessor control system 501 should have stopped the door under normal conditions.

After this length of time has passed, the mono-flop 556 preferably returns to 1 and transmits this information to the AND gate 559 via the connection 571. If the motor 533 does not come to a stop within the specified time, which is a function of the type of door connected, the encoder 531 (see FIG. 27) can continue to send its pulses to the mono-flop 558 by means of the connection 529. The output of the mono-flop 558 is also preferably sent to the AND gate 559 via the connection 572. If high signals are connected to both inputs of the AND gate 559, the output of the AND gate 559 is also switched to high, and forwards this information via the connection 573 to the next downstream AND gate 560.

Since, in this case, the door has not yet stopped, a high signal is still being applied via the connection 561 from the flip-flop 554 to the second input of the AND gate 560. Consequently, the output of the AND gate 560 is also occupied by a high signal, which sets the RS flip-flop 563 by means of the connection 562. The RS flip-flop 563 is thereby inverted and via the connection 528 reports a fault in the system to the fault alarm unit 547 (see FIG. 27), which then, for its part, as described above, brings the motor 533 (see FIG. 27) to a stop. At the same time, a fault is displayed 564 which indicates that the door has been brought to a stop by means of the safety monitoring system 527. The door can only be restarted by means of a reset-start 524 (see FIG. 27). This reset-start 524 is preferably transmitted via the connection 550 to the safety monitoring system 527, where, for its part, by means of the connections 557, it resets the mono-flops 556 and 558 and the RS flip-flop 563.

In such a case, if the microprocessor control system 501 is able to perform normal deceleration of the door, the comparator 553 is also preferably reset by means of the reset signal 551, and it is thereby possible to reactivate the flip-flop 554, in which the emergency stop is still stored, for repeated monitoring. As indicated above, the circuitry specified for the system can operate independently of the microprocessor control 501, as a double-redundancy, or double-channel, safety monitoring system.

Figure 29:
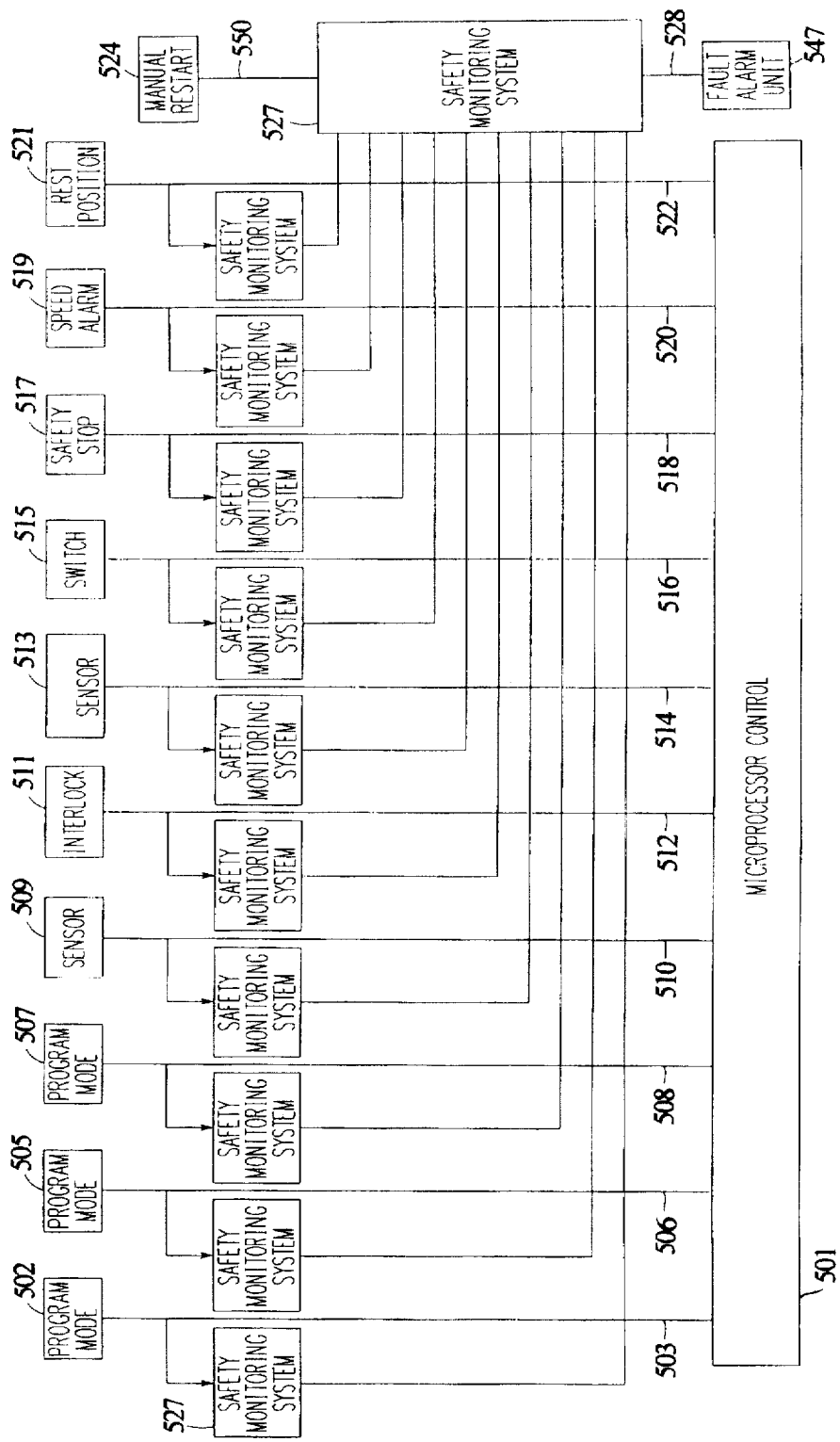
FIG. 29 is a schematic diagram of the circuitry of a safety concept with redundant safety measures.

The specified type of circuitry and thus a redundant embodiment can also be realized, as shown in FIG. 29, for all input signals 502, 505, 507, 509, 511, 513, 515, 517, 519 and 521, where on one hand the information is transmitted directly to the microprocessor control system 501, but on the other hand also directly to the safety monitoring system 527. In this case, the safety monitoring system 527 can function essentially exactly as described above, except that the circuit has been expanded correspondingly.

Therefore, by means of the switches (not all of which have been listed or discussed above) the flow of information can be interrupted, which can necessarily lead to the use of the second channel and thus to a simultaneous verification of the hardware and software. This safety check, by means of the manual switches, is preferably performed in a specified sequence.

With relation to FIG. 29, it is conceivable to provide a single safety monitoring system 527, to which all of the media 502, 505, 507, 509, 511, 513, 515, 517, 519 and 521 for providing input signals are connected, or multiple safety monitoring arrangements 527, each of which may be connected to a single one of the aforementioned input signal media. In the latter case, the multiple safety monitoring arrangements may be interconnected so as to function essentially as a single unit.

It should be understood that, in accordance with at least one preferred embodiment, the safety monitoring system or systems 527 described heretofore, the microprocessor 501, and other basic components, as well as basic programs, program sequences or program steps associated therewith, may function analogously to similar components and program-related phenomena disclosed in U.S. Pat. No. 5,127,190 to Hein et al., entitled "Sliding Door".

Examples of "program modes" discussed heretofore should be generally well-known to those of ordinary skill in the art. They may include, for example, a "fast" program mode, a "slow" program mode and a "wind" program mode. This last program mode could correspond, for example, to the detection of a wind load on an external door.

It will be understood that the above embodiments can be utilized in conjunction with sliding doors, revolving doors, swinging doors, and other types of doors that can be operated automatically.

Several U.S. Patents disclose types of automatic doors, and/or components associated therewith, as well as other conventional components, that may be utilized. These are listed herebelow, with a brief indication as to their basic content.

For example, U.S. Pat. No. 4,697,383, which issued to Hagiwara on Oct. 6, 1987, discloses a controlling device for an automatic door.

U.S. Pat. No. 4,738,052, which issued to Yoshida on Apr. 19, 1988, discloses an automatic door with an automatic lock system.

U.S. Pat. No. 5,187,895, which issued to Huber on Feb. 23, 1993, discloses an automatic revolving door with sensors for detecting an individual.

U.S. Pat. No. 5,196,826, which issued to Whiting on Mar. 23, 1993, discloses sensors which may be utilized.

U.S. Pat. No. 5,205,069, which issued to Shapiro on Apr. 27, 1993, discloses an automatic door assembly.

U.S. Pat. No. 5,247,763, which issued to Hein on Sept. 28, 1993, discloses an automatic sliding door.

Examples of controls, which may be utilized may be found in the following U.S. Pat. Nos.: 4,375,019; 5,226,256; 5,264,834; and 5,323,151.

Examples of motor-encoder arrangements which may be utilized may be found in the following U.S. Pat. Nos.: 5,177,417; 5,192,903; 5,200,675; 5,235,262; and 5,339,727.

Examples of watchdog timer arrangements, which may be utilized may be found in the following U.S. Pat. Nos.: 5,226,152; 5,233,613; and 5,244,350.

Examples of flip-flop arrangements which may be utilized may be found in the following U.S. Pat. Nos.: 5,191,233; 5,208,487; 5,334,917; and 5,222,888.

Examples of monoflop arrangements which may be utilized may be found in the following U.S. Pat. Nos.: 5,086,395; 4,651,234; and 4,746,820.

Examples of S-input arrangements which may be utilized may be found in the following U.S. Pat. Nos.: 5,233,638; 4,904,858; and 4,661,831.

Examples of comparator arrangements which may be utilized may be found in the following U.S. Pat. Nos.: 5,182,500; 5,189,349; 5,194,787; and 5,204,606.

Other examples of doors and controls which may be utilized may be found in the following patent publications: U.S. Pat. No. 5,369,912; International Patent Application No. 93 18 444; Federal Republic of Germany Patent Application No. 41 31 396; European Patent Application No. 0 192 157 (corresponding to U.S. Pat. No. 4,733,343); and European Patent Application No. 0 264 350.

In brief recapitulation, it will be appreciated that the above described embodiment may relate to a control and regulation system for doors, which system is equipped with a microprocessor control. In addition to the normal path of data to the microprocessor control, a dual redundancy is achieved, in that there is a safety monitoring system which receives the same safety-related information as the microprocessor control. This safety monitoring system, for its part, is capable of detecting a fault, i.e. if the microprocessor control system has not shut off the door, the door is shut off by the safety monitoring system, which for its part reports any faults which occur in the system to a fault detection unit, and here again, by means of a redundant shutdown unit, brings the connected motor and thus the door to an immediate stop. In addition to the automatic verification of the safety-related functions, manual verification of the safety functions is also possible.

One feature of the present invention resides broadly in the automatic door which is propelled by means of a drive system, the open-loop or closed-loop control system of which has a microprocessor, whereby the regulation and control actions of the microprocessor are influenced by all sorts of sensors, characterized by the fact that the door is equipped with a system which is capable of recording and/or storing all the dynamic and static parameters of the door, of the propulsion system, of the open-loop or closed-loop control system, as well as the signals from the sensor, in a fault memory.

Another feature of the present invention resides broadly in the automatic door characterized by the fact that the system is a non-volatile dynamic memory.

Yet another feature of the present invention resides broadly in the automatic door characterized by the fact that the recording of the parameters and signals is performed continuously according to the first-in/first-out principle.

Still another feature of the present invention resides broadly in the automatic door characterized by the fact that the time interval to be recorded can be determined variably.

A further feature of the present invention resides broadly in the automatic door characterized by the fact that the system is equipped so that it can be retrofitted on existing door systems.

Another feature of the present invention resides broadly in the automatic door characterized by the fact that the contents of the memory of the system can be retrieved by means of a remote data retrieval command.

Some examples of sampling circuits which may be used in conjunction with the present invention are to be found in U.S. Pat. Nos. 4,891,644; 4,893,067; 4,896,155; 4,901,275; 4,906,865; 4,922,205; and 4,924,224, each of these U.S. patents being hereby expressly incorporated by reference herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 43 43 191.7, filed on Dec. 17, 1993, having inventor Klaus Elischewski, and DE-OS 43 43 191.7 and DE-PS 43 43 191.7 and International Application No. PCT/DE94/01122 filed on Sept. 22, 1994, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for monitoring the operation of an automatic door:

said automatic door including:
at least one movable door panel member movable between at least a first position and a second position;
a motor to move said at least one movable door panel member between at least said first and second positions;
a motor control arrangement to control the operation of said motor;
said motor control arrangement including at least one of an open loop control system for the control of said motor and a closed loop control system for the control of said motor;
at least one sensor; and
a processor for receiving and processing values from said at least one sensor and for transmitting control values to said motor control arrangement;

said monitoring apparatus comprising:
an arrangement to receive and retain data, relating to the operation of said automatic door, received operatively from at least said at least one sensor;
apparatus to generate a time ordered series of values relating to the received data relating to the operation of said automatic door;
said time ordered series of values comprising all of the following:
at least one parameter of said at least one movable door panel member;
at least one parameter of said motor;
at least one parameter of said motor control arrangement; and
at least one parameter of said at least one sensor;
an arrangement to store said time ordered series of values in said arrangement to receive and retain;
said arrangement to store said time ordered series of values in said arrangement to receive and retain being configured to store said time ordered series of values in said arrangement to receive and retain on a first in/first out basis;
said arrangement to store said time ordered series of values in said arrangement to receive and retain on a first in/first out basis comprising:
said apparatus to generate said time ordered series of values;
apparatus to sequentially store said generated time ordered series of values in said arrangement to receive and retain;
apparatus to generate a most recent value;
apparatus to store said most recent value in said arrangement to receive and retain;
apparatus to discard the oldest value stored in said arrangement to receive and retain;
said arrangement to receive and retain comprising a non-volatile dynamic memory element;
said time ordered series of values being generated over a determined time period of operation of said automatic door;
apparatus to select said determined time period of operation of said automatic door over which said time ordered series of values are generated;
a remote data acquisition station, said remote data acquisition station being distinct and substantially spatially separated from said automatic door;
an arrangement to transmit at least some of said time ordered series of values from said arrangement to receive and retain to said remote data acquisition station;
apparatus to generate a remote data retrieval command at said remote data acquisition station;
apparatus to transmit said remote data retrieval command from said remote data acquisition station to said automatic door; and
an arrangement to transmit, in response to receipt of said remote data retrieval command at said automatic door, at least some of said time ordered series of values from said automatic door to said remote data acquisition station.

2. Apparatus for monitoring the operation of an automatic door according to claim 1, said apparatus additionally comprising apparatus to retrofit said arrangement to receive and retain to a previously installed automatic door, said apparatus to retrofit comprising:
an arrangement to operatively connect said arrangement to receive and retain to a previously installed automatic door;
said apparatus to generate being configured to generate said time ordered series of values relating to the operation of a previously installed automatic door; and
said arrangement to store said time ordered series of values in said arrangement to receive and retain being configured to store time ordered series of values relating to the operation of a previously installed automatic door to thereby monitor the operation of said previously installed automatic door.

3. An automatic door with apparatus for monitoring the operation of said automatic door, said automatic door comprising:
at least one movable door panel member movable between at least a first position and a second position;
a motor for moving said at least one movable door panel member between at least said first and second positions;

a motor control circuit for controlling the operation of said motor;

said motor control circuit including at least one of an open loop control system for the control of said motor and a closed loop control system for the control of said motor;

at least one sensor;

a microprocessor for receiving and processing signals from said at least one sensor, and for transmitting control signals to said motor control circuit;

said monitoring apparatus comprising:

memory means for receiving and storing data relating to the operation of said automatic door;

means for generating a time ordered series of data samples relating to the received data relating to the operation of said automatic door;

said time ordered series of data samples comprising all of the following:

at least one parameter of said at least one movable door panel member;

at least one parameter of said motor;

at least one parameter of said motor control circuit;

at least one parameter of said at least one sensor; and means for storing said time ordered series of data samples in said memory means;

said means for storing said time ordered series of data samples in said memory means comprising means for storing said time ordered series of data samples in said memory means on a first in/first out basis;

said means for storing said time ordered series of data samples in said memory means on a first in/first out basis comprising:

said means for generating said time ordered series of data samples;

means for sequentially storing said generated time ordered series of data samples in said memory means;

means for generating a most recent data sample;

means for storing said most recent data sample in said memory means; and means for discarding the oldest data sample stored in said memory means;

said memory means for storing data comprising a non-volatile dynamic memory element;

said time ordered series of data samples being generated over a determined time period of operation of said automatic door;

means for selecting said determined time period of operation of said automatic door over which said time ordered series of data samples are generated;

a remote data acquisition station, said remote data acquisition station being distinct and substantially spatially separated from said automatic door;

means for transmitting at least some of said time ordered series of data samples from said memory means to said remote data acquisition station;

means for generating a remote data retrieval command at said remote data acquisition station;

means for transmitting said remote data retrieval command from said remote data acquisition station to said automatic door; and means for, in response to receipt of said remote data retrieval command at said automatic door, transmitting at least some of said time ordered series of data samples from said automatic door to said remote data acquisition station.

4. The automatic door according to claim 3, wherein:

said memory means comprises means for retrofitting said memory means on a previously installed automatic door;

said means for retrofitting comprises:

means for operatively connecting said memory means to a previously installed automatic door;

said means for generating said time ordered series of data samples being configured to generate time ordered series of data samples relating to the operation of a previously installed automatic door; and said means for storing said time ordered series of data samples in said memory means being configured to store time ordered series of data relating to the operation of a previously installed automatic door in said memory means to thereby monitor the operation of said previously installed automatic door.

5. A process for monitoring the operation of an automatic door, said automatic door comprising:

at least one movable door panel member movable between at least a first position and a second position;

a motor for moving said at least one movable door panel member between at least said first and second positions;

a motor control circuit for controlling the operation of said motor;

said motor control circuit including at least one of an open loop control system for the control of said motor and a closed loop control system for the control of said motor;

at least one sensor; and a microprocessor for receiving and processing signals from said at least one sensor, and for transmitting control signals to said motor control circuit;

said process comprising the steps of:

generating a time ordered series of data samples relating to the operation of said automatic door;

said time ordered series of data samples comprising a plurality of the following:

at least one parameter of said at least one movable door panel member;

at least one parameter of said motor;

at least one parameter of said motor control circuit; and at least one parameter of said at least one sensor;

storing said time ordered series of data samples in memory means;

said step of storing said time ordered series of data samples in said memory means being on a first in/first out basis and comprising the steps of:

generating said time ordered series of data samples;

sequentially storing said generated time ordered series of data samples in said memory means;

generating a most recent data sample;

storing said most recent data sample in said memory means; and discarding the oldest data sample stored in said memory means;

said memory means comprising a non-volatile dynamic memory element;

said time ordered series of data samples being generated over a determined time period of operation of said automatic door;

selecting said determined time period of operation of said automatic door over which said time ordered series of data samples are generated;

transmitting at least some of said time ordered series of data samples from said memory means to a remote data acquisition station, the remote data acquisition station being distinct and substantially spatially separated from said automatic door;

generating a remote data retrieval command at said remote data acquisition station;

transmitting said remote data retrieval command from said remote data acquisition station to said automatic door; and in response to receipt of said remote data retrieval command at said automatic door, transmitting at least some of said time ordered series of data samples from said automatic door to said remote data acquisition station.

6. A process for monitoring the operation of an automatic door according to claim 5, said process additionally comprising the further step of retrofitting said memory means to a previously installed automatic door, said step of retrofitting comprising:

operatively connecting said memory means to said previously installed automatic door;

generating said time ordered series of data samples relating to the operation of said previously installed automatic door; and storing said time ordered series of data samples relating to the operation of said previously installed automatic door in said memory means to thereby monitor the operation of said previously installed automatic door.

7. A process for monitoring the operation of an automatic door according to claim 6, wherein said time ordered series of data samples comprises all of the following:

said at least one parameter of said at least one movable door panel member;

said at least one parameter of said motor;

said at least one parameter of said motor control circuit; and said at least one parameter of said at least one sensor.

8. A process for monitoring the operation of an automatic door according to claim 5, wherein said time ordered series of data samples comprises all of the following:

said at least one parameter of said at least one movable door panel member;

said at least one parameter of said motor;

said at least one parameter of said motor control circuit; and said at least one parameter of said at least one sensor.

9. A monitoring apparatus to monitor the operation of an automatic door;

said automatic door including:

at least one door panel movable between at least a first position and a second position;

a motor for moving said at least one door panel between said at least said first and second positions;

a motor control arrangement to control the operation of said motor;

said motor control arrangement comprising at least one of an open loop control system for the control of said motor and a closed loop control system for the control of said motor;

at least one sensor; and a processor to receive and process values from said at least one sensor, and to transmit control values to said motor control arrangement;

said monitoring apparatus comprising:

a memory arrangement to receive and retain data relating to the operation of said automatic door;

apparatus to generate a time ordered series of values relating to the received data relating to the operation of said automatic door;

said time ordered series of values comprising at least one of the following:

at least one parameter of said at least one movable door panel member;

at least one parameter of said motor;

at least one parameter of said motor control arrangement; and at least one parameter of said at least one sensor;

an arrangement to store said time ordered series of values in said memory arrangement;

a remote data acquisition station, said remote data acquisition station being distinct and substantially spatially separated from an automatic door;

an arrangement to transmit at least some of said time ordered series of values from said memory arrangement to said remote data acquisition station;

said remote data acquisition station comprising apparatus to generate a remote data retrieval command;

apparatus to transmit said remote data retrieval command from said remote data acquisition station; and said arrangement to transmit being configured to transmit at least some of said time ordered series of values from said memory arrangement to said remote data acquisition station, in response to receipt of said remote data retrieval command.

\* \* \* \* \*